(12) United States Patent
Song et al.

(10) Patent No.: US 12,386,448 B2
(45) Date of Patent: Aug. 12, 2025

(54) DISPLAY DEVICE

(71) Applicant: Samsung Display Co., Ltd., Yongin-si (KR)

(72) Inventors: Heerim Song, Yongin-si (KR); Taegyun Kim, Yongin-si (KR); Heejean Park, Yongin-si (KR); Yujin Lee, Yongin-si (KR); Cheol-Gon Lee, Yongin-si (KR); Mukyung Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 2 days.

(21) Appl. No.: 18/231,143

(22) Filed: Aug. 7, 2023

(65) Prior Publication Data

US 2024/0118758 A1 Apr. 11, 2024

(30) Foreign Application Priority Data

Oct. 5, 2022 (KR) ........................ 10-2022-0127369

(51) Int. Cl.
*G06F 3/041* (2006.01)
*G06V 40/13* (2022.01)
*G09G 3/3233* (2016.01)

(52) U.S. Cl.
CPC ........ *G06F 3/0412* (2013.01); *G06F 3/04164* (2019.05); *G06F 3/04166* (2019.05); *G06V 40/1306* (2022.01); *G09G 3/3233* (2013.01); *G09G 2300/0819* (2013.01);
(Continued)

(58) Field of Classification Search
CPC ............... G06F 3/0412; G06F 3/04164; G06F 3/04166; G06F 3/0416; G06F 3/044; G06F 3/046; G06V 40/1306; G09G 3/3233; G09G 2300/0819; G09G 2300/0842; G09G 2310/08; G09G 2354/00; G09G 3/20; G09G 3/3266; G09G 3/3208; H10K 39/34; H10K 59/12; H10K 59/40; H10K 50/844
See application file for complete search history.

(56) References Cited

U.S. PATENT DOCUMENTS 8,581,883 B2 11/2013 Jeon et al.
9,064,458 B2 6/2015 Lee
2018/0004353 A1* 1/2018 Shin ...................... G02F 1/1343
(Continued)

FOREIGN PATENT DOCUMENTS

KR 10-0814877 B1 3/2008
KR 10-1056284 B1 8/2011
(Continued)

*Primary Examiner* — Sahlu Okebato
(74) *Attorney, Agent, or Firm* — Womble Bond Dickinson (US) LLP

(57) ABSTRACT

A display device includes: a pixel including a light emitting element; a sensor including a sensing element and a sensor driving circuit; and a sensor driver to output a sensor scan signal to the sensor driving circuit. The sensor driver includes: a switching circuit connected between a first input terminal for receiving a first clock signal of a first operating frequency and a first clock node, and to output a first filtering clock signal of a second operating frequency to the first clock node in response to a first enable signal; and a driving circuit to output the sensor scan signal in response to the first filtering clock signal of the first clock node.

26 Claims, 20 Drawing Sheets

(52) U.S. Cl.
CPC . *G09G 2300/0842* (2013.01); *G09G 2310/08* (2013.01); *G09G 2354/00* (2013.01)

(56) References Cited

U.S. PATENT DOCUMENTS

| | | | |
|---|---|---|---|
| 2020/0152125 A1* | 5/2020 | Ye | G09G 3/3258 |
| 2021/0165518 A1* | 6/2021 | Shin | G06F 3/04164 |
| 2022/0067340 A1* | 3/2022 | Han | G06V 40/1365 |

FOREIGN PATENT DOCUMENTS

| | | |
|---|---|---|
| KR | 10-2020-0055597 A | 5/2020 |
| KR | 10-2021-0083620 A | 7/2021 |
| KR | 10-2393725 B1 | 5/2022 |

\* cited by examiner

DISPLAY DEVICE

CROSS-REFERENCE TO RELATED APPLICATION

This application claims priority to and the benefit of Korean Patent Application No. 10-2022-0127369, filed on Oct. 5, 2022, in the Korean Intellectual Property Office, the entire disclosure of which is incorporated by reference herein.

BACKGROUND

Aspects of embodiments of the present disclosure relate to a display device, and more particularly, to a display device capable of biometric information recognition and touch recognition.

A display device provides various functions to provide information to a user by displaying an image or to communicate organically with the user, such as detecting a user input. Recently, display devices include a function to detect the user's biometric information. Biometric information recognition schemes include a capacitive scheme that detects a change in capacitance between electrodes, an optical scheme that detects incident light by using an optical sensor, and an ultrasonic scheme that detects vibration by using a piezoelectric material or the like.

The above information disclosed in this Background section is for enhancement of understanding of the background of the present disclosure, and therefore, it may contain information that does not constitute prior art.

SUMMARY

Embodiments of the present disclosure are directed to a display device including a sensor capable of detecting both biometric information and a touch.

According to one or more embodiments of the present disclosure, a display device includes: a pixel including a light emitting element; a sensor including a sensing element and a sensor driving circuit; and a sensor driver configured to output a sensor scan signal to the sensor driving circuit. The sensor driver includes: a switching circuit connected between a first input terminal for receiving a first clock signal of a first operating frequency and a first clock node, and configured to output a first filtering clock signal of a second operating frequency to the first clock node in response to a first enable signal; and a driving circuit configured to output the sensor scan signal in response to the first filtering clock signal of the first clock node.

In an embodiment, when the first enable signal indicates a first detection mode, the second operating frequency of the first filtering clock signal may be the same as the first operating frequency.

In an embodiment, when the first enable signal indicates a second detection mode, the second operating frequency of the first filtering clock signal may be lower than the first operating frequency.

In an embodiment, in the second detection mode, a frequency of the first enable signal may be the second operating frequency.

In an embodiment, when each of the first clock signal and the first enable signal is at a first level, the first filtering clock signal may be at the first level.

In an embodiment, the switching circuit may include a first switching transistor connected between the first input terminal and the first clock node, and including a gate electrode connected to a second input terminal for receiving the first enable signal.

In an embodiment, the switching circuit may be connected between a third input terminal for receiving a second clock signal of the first operating frequency and a second clock node, and may be configured to output a second filtering clock signal of the second operating frequency to the second clock node in response to a second enable signal, and the driving circuit may be configured to output the sensor scan signal in response to the first filtering clock signal of the first clock node and the second filtering clock signal of the second clock node.

In an embodiment, the switching circuit may further include a second switching transistor connected between the third input terminal and the second clock node, and including a gate electrode connected to a fourth input terminal for receiving the second enable signal.

In an embodiment, the switching circuit may further include a third switching transistor connected between a third clock node and the first input terminal, and including a gate electrode connected to the second input terminal, and the driving circuit may be configured to output the sensor scan signal in response to the first filtering clock signal of the first clock node, the second filtering clock signal of the second clock node, and a third filtering clock signal of the third clock node.

In an embodiment, in the first detection mode, frequencies of the first clock signal and the second clock signal may be the same as each other, and phases of the first clock signal and the second clock signal may be the same as each other, and in the second detection mode, the frequencies of the first clock signal and the second clock signal may be the same as each other, and the phases of the first clock signal and the second clock signal may be different from each other.

According to one or more embodiments of the present disclosure, a display device includes: a pixel including a light emitting element; a sensor including a plurality of sensing elements connected to a plurality of sensor scan lines, respectively; a driving controller configured to output a sensor control signal corresponding to a detection mode; and a sensor driver configured to operate in response to the sensor control signal, and including a plurality of driving stages, each of the driving stages being configured to provide a sensor scan signal to a corresponding sensor scan line from among the plurality of sensor scan lines. Each of the driving stages includes: a switching circuit connected between a first input terminal for receiving a first clock signal of a first operating frequency and a first clock node, and configured to output a first filtering clock signal of a second operating frequency to the first clock node in response to a first enable signal; and a driving circuit configured to output the sensor scan signal in response to the first filtering clock signal of the first clock node.

In an embodiment, when the first enable signal indicates a first detection mode, the second operating frequency of the first filtering clock signal may be the same as the first operating frequency, and when the first enable signal indicates a second detection mode, the second operating frequency of the first filtering clock signal may be lower than the first operating frequency.

In an embodiment, in the second detection mode, a frequency of the first enable signal may be the second operating frequency.

In an embodiment, the switching circuit may include a first switching transistor connected between the first input terminal and the first clock node, and including a gate electrode connected to a second input terminal for receiving the first enable signal.

According to one or more embodiments of the present disclosure, a display device includes: a pixel including a light emitting element; a sensor including a sensing element and a sensor driving circuit; and a sensor driver configured to output a sensor scan signal to the sensor driving circuit. The sensor driver includes: a buffer circuit electrically connected to a first output node and a second output node, and configured to output the sensor scan signal; a first sensing driving circuit configured to output a first touch sensing signal and a second touch sensing signal to the first output node and the second output node, respectively, in a first detection mode; and a second sensing driving circuit configured to output a first fingerprint sensing signal and a second fingerprint sensing signal to the first output node and the second output node, respectively, in a second detection mode.

In an embodiment, the first sensing driving circuit may include: a first driving circuit configured to receive a first input signal and a fingerprint clock signal, and including a first internal node and a second internal node; a first switch connected between the first internal node and the first output node, and configured to output a signal of the first internal node as the first fingerprint sensing signal in response to a fingerprint enable signal; and a second switch connected between the second internal node and the second output node, and configured to output a signal of the second internal node as the second fingerprint sensing signal in response to the fingerprint enable signal.

In an embodiment, the second sensing driving circuit may include: a second driving circuit configured to receive a second input signal and a touch clock signal, and including a third internal node and a fourth internal node; a third switch connected between the third internal node and the first output node, and configured to output a signal of the third internal node as the first touch sensing signal in response to a touch enable signal; and a fourth switch connected between the fourth internal node and the second output node, and configured to output a signal of the fourth internal node as the second touch sensing signal in response to the touch enable signal.

In an embodiment, in the first detection mode, the touch enable signal may be at an active level, and the fingerprint enable signal may be at an inactive level, and in the second detection mode, the touch enable signal may be at an inactive level, and the fingerprint enable signal may be at an active level.

In an embodiment, the touch clock signal may have a first operating frequency, and the fingerprint clock signal may have a second operating frequency lower than the first operating frequency.

In an embodiment, in the first detection mode, each of the first touch sensing signal and the second touch sensing signal may have a first operating frequency, and in the second detection mode, each of the first fingerprint sensing signal and the second fingerprint sensing signal may have a second operating frequency lower than the first operating frequency.

In an embodiment, the buffer circuit may include: a first buffer transistor connected between a first voltage input terminal and an output terminal for outputting the sensor scan signal, and including a gate electrode connected to the first output node; and a second buffer transistor connected between the output terminal and an input terminal, and including a gate electrode connected to the second output node.

In an embodiment, the input terminal may be configured to receive the touch clock signal in the first detection mode, and receive the fingerprint clock signal in the second detection mode.

According to one or more embodiments of the present disclosure, a display device includes: a base layer; a circuit layer on the base layer; and an element layer on the circuit layer, and including a light emitting element and a sensing element. The circuit layer includes: a sensor driving circuit connected to the sensing element; and a sensor driver configured to output a sensor scan signal to the sensor driving circuit. The sensor driver includes: a buffer circuit electrically connected to a first output node and a second output node, and configured to output the sensor scan signal; a first sensing driving circuit configured to output a first touch sensing signal and a second touch sensing signal to the first output node and the second output node, respectively, in a first detection mode; and a second sensing driving circuit configured to output a first fingerprint sensing signal and a second fingerprint sensing signal to the first output node and the second output node, respectively, in a second detection mode.

In an embodiment, in the first detection mode, the first sensing driving circuit may be configured to output the first touch sensing signal and the second touch sensing signal to the first output node and the second output node, respectively, in response to a touch enable signal at an active level, and in the second detection mode, the second sensing driving circuit may be configured to output the first fingerprint sensing signal and the second fingerprint sensing signal to the first output node and the second output node, respectively, in response to a fingerprint enable signal at an active level.

In an embodiment, the buffer circuit may include: a first buffer transistor connected between a first voltage input terminal and an output terminal for outputting the sensor scan signal, and including a gate electrode connected to the first output node; and a second buffer transistor connected between the output terminal and an input terminal, and including a gate electrode connected to the second output node.

In an embodiment, the input terminal may be configured to receive a touch clock signal in the first detection mode, and receive a fingerprint clock signal in the second detection mode.

BRIEF DESCRIPTION OF THE FIGURES

The above and other aspects and features of the present disclosure will be more clearly understood from the following detailed description of the illustrative, non-limiting embodiments with reference to the accompanying drawings.

DETAILED DESCRIPTION

Figure 1:
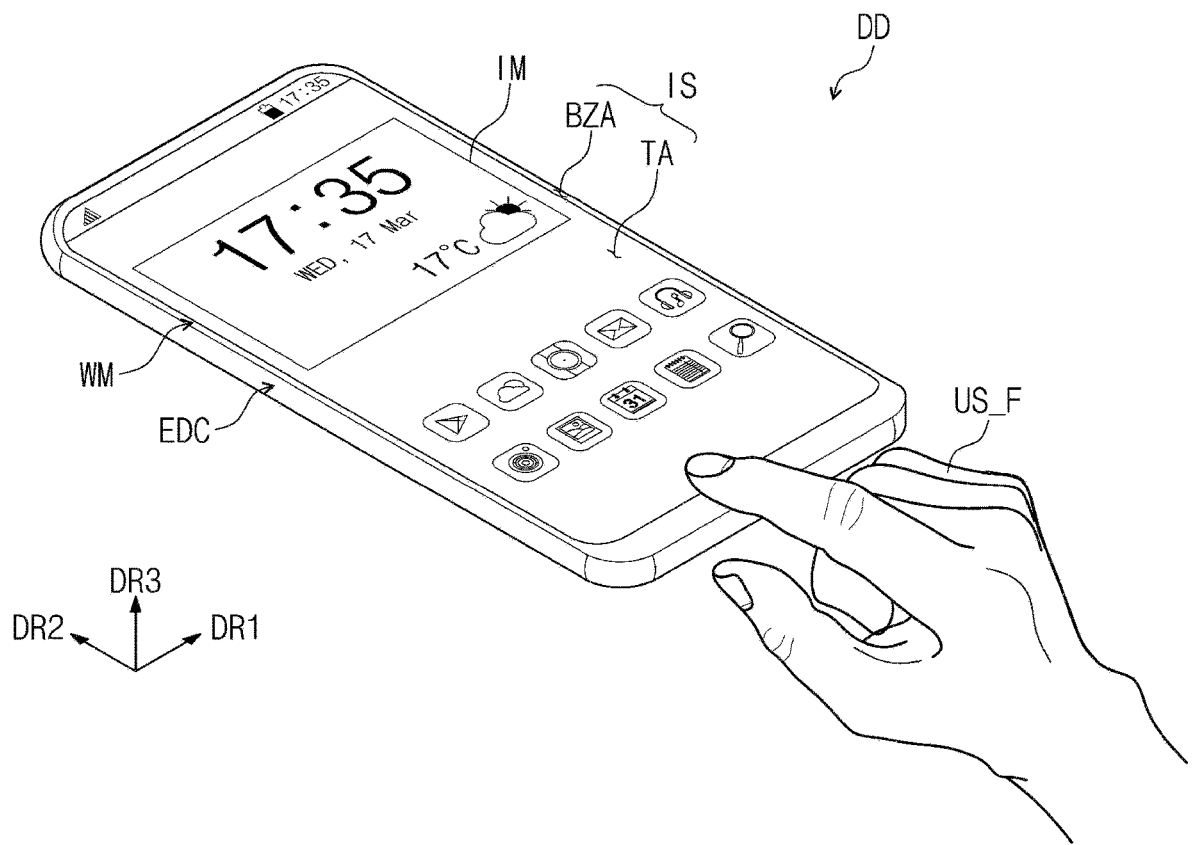
FIG. 1 is a perspective view of a display device, according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B.

Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
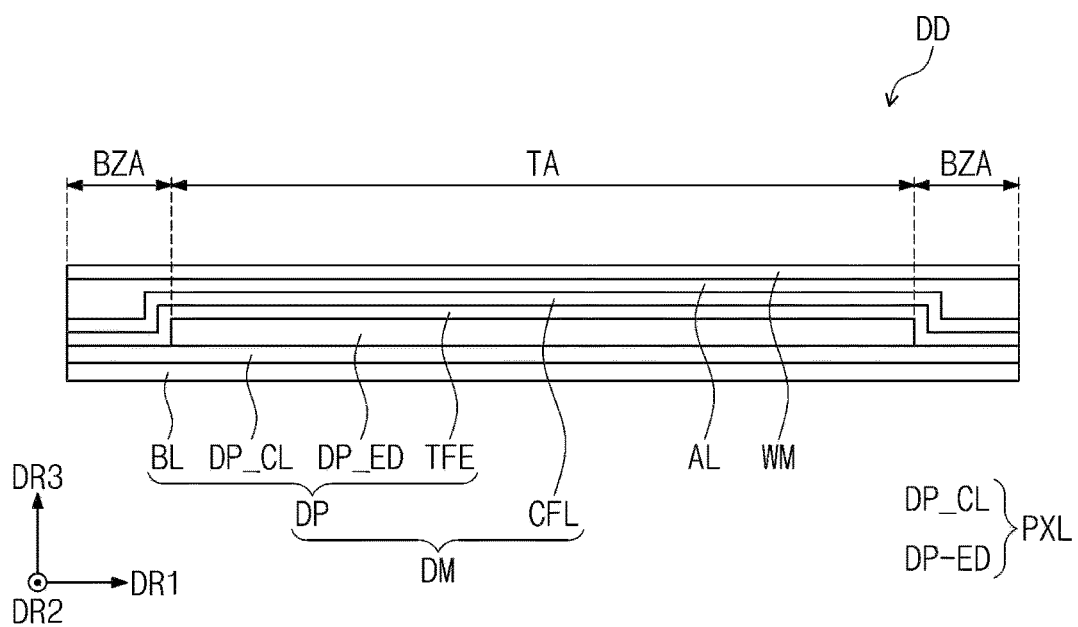
FIG. 2 is a cross-sectional view of a display device, according to an embodiment of the present disclosure.

FIG. 1 is a perspective view of a display device DD, according to an embodiment of the present disclosure. FIG. 2 is a cross-sectional view of the display device DD, according to an embodiment of the present disclosure.

Referring to FIGS. 1 and 2, the display device DD may be a device that is activated depending on an electrical signal. For example, the display device DD may be a mobile phone, a tablet PC, a car navigation system, a game console, or a wearable device, but the present disclosure is not limited thereto. For convenience, FIG. 1 illustrates that the display device DD is a mobile phone.

In addition, although a rigid-type of display device DD in the form of a bar is illustrated in FIG. 1, the present disclosure is not limited thereto. For example, the display device DD may be a foldable, rollable, or slidable display device DD.

A top surface of the display device DD may be defined as a display surface IS, and may have a plane defined by a first direction DR1 and a second direction DR2. Images IM generated by the display device DD may be provided to a user through the display surface IS. Hereinafter, a normal direction that is perpendicular to or substantially perpendicular to a plane defined by the first direction DR1 and the second direction DR2 is defined as a third direction DR3. As used in the present specification, the phrases "when viewed from above a plane" and "in a plan view" may refer to a view of an object when viewed in/from the third direction DR3. In other words, the plane may be parallel to or substantially parallel to the plane defined by the first and second directions DR1 and DR2.

The display surface IS may be divided into a transmission area TA and a bezel area BZA. The transmission area TA may be an area in which the images IM are displayed. The user may visually perceive the images IM through the transmission area TA. In an embodiment, the transmission area TA is illustrated in the shape of a quadrangle having corners that are rounded. However, the present disclosure is not limited thereto. The transmission area TA may have various suitable shapes, and is not limited to any particular embodiment.

The bezel area BZA is adjacent to the transmission area TA. The bezel area BZA may have a suitable color (e.g., a predetermined color). The bezel area BZA may surround (e.g., around a periphery of) the transmission area TA. Accordingly, the shape of the transmission area TA may be defined or substantially defined by the bezel area BZA. However, the present disclosure is not limited thereto. For example, the bezel area BZA may be disposed to be adjacent to only one side of the transmission area TA, or may be omitted as needed or desired.

The display device DD may sense an external input applied from the outside. The external input may include various suitable types of inputs that are provided from the outside of the display device DD. For example, in addition to a contact by a part of a body, such as the user's hand US_F, the external input may also include an external input (e.g., such as hovering) applied when the user's hand US_F approaches the display device DD or is adjacent to the display device DD within a suitable distance (e.g., a predetermined distance). In addition, the external input may include various suitable types of external inputs, such as force, pressure, temperature, light, and the like. The external input may be provided by a separate device, for example, such as an active pen or a digitizer pen. Further, the display device DD may detect the user's biometric information that is applied from the outside.

The appearance of the display device DD may include a window WM and a housing EDC. For example, the window WM and the housing EDC may be connected to (e.g., coupled to or attached to) each other, and other components of the display device DD, for example, such as a display module (e.g., a display or a touch-display) DM may be accommodated therein.

A front surface of the window WM defines the display surface IS of the display device DD. The window WM may include an optically transparent insulating material. For example, the window WM may include glass or plastic. The window WM may include a multi-layered structure or a single layer structure. For example, the window WM may include a plurality of plastic films that are bonded to each other by an adhesive, or may include a glass substrate and a plastic film that are bonded to each other by an adhesive.

The housing EDC may include a suitable material having a relatively high rigidity. For example, the housing EDC may include glass, plastic, or a metal, or may include a plurality of frames and/or plates that are composed of a suitable combination thereof. The housing EDC may stably protect the configurations of the display device DD accommodated in the inner space from external impacts. In some embodiments, a battery module (e.g., a battery) for supplying power used for the overall operations of the display device DD may be interposed between the display module DM and the housing EDC.

The display module DM may include a display panel DP and an anti-reflection layer CFL.

The display panel DP may be a configuration that generates or substantially generates an image. The display panel DP may be a light emitting display panel. For example, the display panel DP may be an organic light emitting display panel, an inorganic light emitting display panel, an organic-inorganic light emitting display panel, a quantum dot display panel, a micro-LED display panel, or a nano-LED display panel. Hereinafter, for convenience, the display panel DP is described in more detail in the context of an organic light emitting display panel.

The display panel DP includes a base layer BL, a pixel layer PXL, and an encapsulation layer TFE. The display panel DP according to an embodiment of the present disclosure may be a flexible display panel. However, the present disclosure is not limited thereto. For example, the display panel DP may be a foldable display panel, which may be folded with respect to a folding axis, or a rigid display panel.

The base layer BL may include a synthetic resin layer. The synthetic resin layer may be a polyimide-based resin layer, but the material of the base layer BL is not particularly limited thereto. For example, the base layer BL may include a glass substrate, a metal substrate, an organic/inorganic composite substrate, or the like.

The pixel layer PXL is disposed on the base layer BL. The pixel layer PXL may include a circuit layer DP_CL and an element layer DP_ED. The circuit layer DP_CL is interposed between the base layer BL and the element layer DP_ED.

The circuit layer DP_CL includes at least one insulating layer, and a circuit element. Hereinafter, the insulating layer included in the circuit layer DP_CL is referred to as an "intermediate insulating layer". The intermediate insulating layer includes at least one intermediate inorganic film, and at least one intermediate organic film. The circuit element may include a pixel driving circuit, which is included in each of a plurality of pixels for displaying an image, and a sensor driving circuit, which is included in each of a plurality of sensors for recognizing external information. The circuit layer DP_CL may further include signal lines connected to the pixel driving circuit and/or the sensor driving circuit.

As an example, each of the plurality of sensors may be a fingerprint recognition sensor, a proximity sensor, an iris recognition sensor, or the like. Furthermore, each of the plurality of sensors may be an optical sensor that recognizes biometric information in an optical scheme. According to an embodiment of the present disclosure, an external input (e.g., a user's touch), as well as biometric information, such as a fingerprint, may be sensed by using the plurality of sensors. Accordingly, the display device DD may not include a separate input sensing layer for sensing the external input. In this case, the thickness of the display device DD may be further reduced. As a result, flexibility may be improved, and thus, the display device DD may be implemented in various suitable types. For example, the display device DD may be implemented as a foldable, rollable, or slidable display device as described above.

The element layer DP_ED may include a light emitting element included in each of the pixels, and a light sensing element included in each of the sensors. As an example, the light sensing element may be a photodiode. The light sensing element may be a sensor that detects or responds to light that is reflected by a user's fingerprint. The circuit layer DP_CL and the element layer DP_ED will be described in more detail below with reference to FIG. 21.

The encapsulation layer TFE encapsulates the element layer DP_ED. The encapsulation layer TFE may include at least one organic film, and at least one inorganic film. The inorganic film may include one or more inorganic materials, and may protect the element layer DP_ED from moisture/oxygen. The inorganic film may include a silicon nitride layer, a silicon oxynitride layer, a silicon oxide layer, a titanium oxide layer, an aluminum oxide layer, or the like, but the present disclosure is not limited particularly thereto.

The organic film may include one or more organic materials, and may protect the element layer DP_ED from foreign objects, such as dust particles.

The anti-reflection layer CFL may be disposed on the display panel DP. The anti-reflection layer CFL may reduce a reflectance of external light that is incident from the outside of the display device DD. The anti-reflection layer CFL may be formed on the display panel DP through sequential processes, but the present disclosure is not limited thereto. For example, the anti-reflection layer CFL may include color filters, a black matrix, and a planarization layer. The color filters may have a suitable arrangement. For example, the color filters may be arranged in consideration of the emission colors of the pixels included in the display panel DP. In an embodiment, the anti-reflection layer CFL may include a black matrix and a reflection adjustment layer. The reflection adjustment layer may selectively absorb light in a partial band from among light reflected from inside the display panel DP and/or the electronic device, or incident light from the outside of the display panel DP and/or the electronic device. In an embodiment, the anti-reflection layer CFL may be a polarizing film.

The display device DD according to an embodiment of the present disclosure may further include an adhesive layer AL. The window WM may be attached to the anti-reflection layer CFL by the adhesive layer AL. The adhesive layer AL may include an optical clear adhesive, an optically clear adhesive resin, or a pressure sensitive adhesive (PSA).

Figure 3:
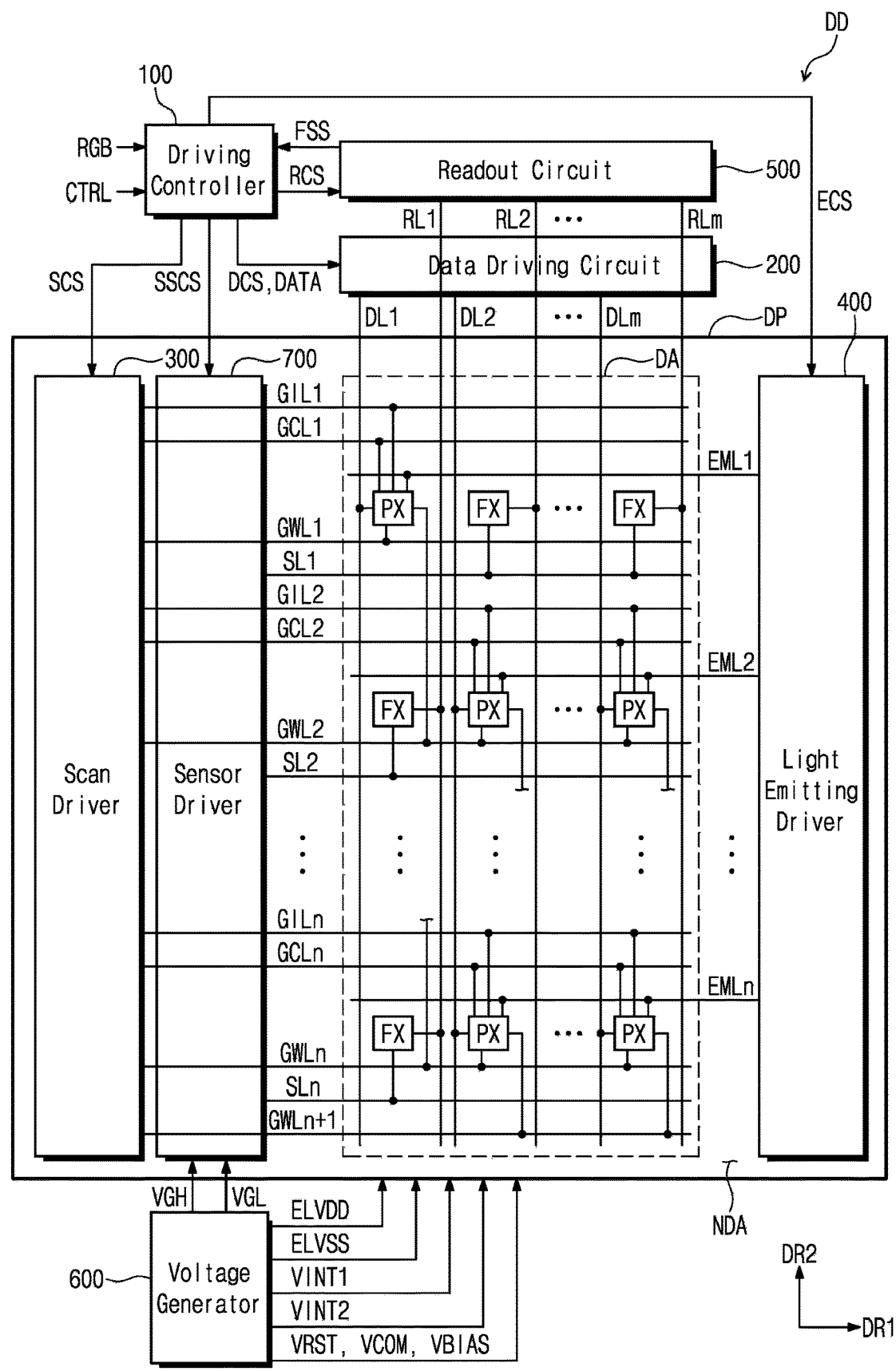
FIG. 3 is a block diagram of a display device, according to an embodiment of the present disclosure.

FIG. 3 is a block diagram of a display device, according to an embodiment of the present disclosure.

Referring to FIG. 3, the display device DD includes the display panel DP, a driving controller 100, a data driving circuit 200, a scan driver 300, a light emitting driver 400, a readout circuit 500, a voltage generator 600, and a sensor driver 700.

The driving controller 100 receives an input image signal RGB and a control signal CTRL. The driving controller 100 generates an output image signal DATA by converting a data format of the input image signal RGB, so as to be suitable for the display panel DP of the data driving circuit 200. The driving controller 100 outputs a scan control signal SCS, a data control signal DCS, an emission control signal ECS, and a sensor control signal SSCS. In an embodiment, the driving controller 100 may output the sensor control signal SSCS corresponding to a detection mode.

The data driving circuit 200 receives the data control signal DCS and the output image signal DATA from the driving controller 100. The data driving circuit 200 converts the output image signal DATA into data signals, and outputs the data signals to a plurality of data lines DL1 to DLm, which will be described in more detail below. The data signals refer to analog voltages corresponding to a grayscale level of the output image signal DATA.

The voltage generator 600 generates voltages used to operate the display panel DP. In an embodiment, the voltage generator 600 generates a first driving voltage ELVDD, a second driving voltage ELVSS, a first initialization voltage VINT1, a second initialization voltage VINT2, a reset voltage VRST, a sensor driving voltage VCOM, and a bias voltage VBIAS.

The display panel DP includes scan lines GIL1 to GILn, GCL1 to GCLn, and GWL1 to GWLn+1, sensor scan lines SL1 to SLn, emission lines EML1 to EMLn, data lines DL1 to DLm, readout lines RL1 to RLm, pixels PX, and sensors FX. Here, n and m are natural numbers.

The display panel DP may include a display area DA corresponding to the transmission area TA (e.g., see FIG. 1), and a non-display area NDA corresponding to the bezel area BZA. The pixels PX and the sensors FX may be disposed in the display area DA.

The scan driver 300, the sensor driver 700, and the light emitting driver 400 may be positioned in the non-display area NDA of the display panel DP.

In an embodiment, the scan driver 300 and the sensor driver 700 may be arranged on a first side of the display panel DP. The scan driver 300 receives the scan control signal SCS from the driving controller 100. The scan driver 300 may output scan signals to the scan lines GIL1 to GILn, GCL1 to GCLn, and GWL1 to GWLn+1 in response to the scan control signal SCS. The scan lines GIL1 to GILn, GCL1 to GCLn, and GWL1 to GWLn+1 extend from the scan driver 300 in the first direction DR1.

The sensor driver 700 is arranged to be adjacent to the scan driver 300 on the first side of the display panel DP. The sensor driver 700 receives the sensor control signal SSCS from the driving controller 100. The sensor driver 700 may output sensor scan signals to the sensor scan lines SL1 to SLn in response to the sensor control signal SSCS. The sensor scan lines SL1 to SLn extend from the sensor driver 700 in the first direction DR1.

The light emitting driver 400 is arranged on a second side of the display panel DP. The light emitting driver 400 receives the emission control signal ECS from the driving controller 100. The sensor driver 700 may output emission signals to the emission lines EML1 to EMLn in response to the emission control signal ECS. The emission lines EML1 to EMLn extend from the light emitting driver 400 in a direction opposite to the first direction DR1.

The scan lines GIL1 to GILn, GCL1 to GCLn, and GWL1 to GWLn, the sensor scan lines SL1 to SLn, and the emission lines EML1 to EMLn are arranged to be spaced from one another in the second direction DR2. The data lines DL1 to DLm extend from the data driving circuit 200 in a direction opposite to the second direction DR2, and are arranged to be spaced from one another in the first direction DR1.

The plurality of pixels PX are electrically connected to the scan lines GIL1 to GILn, GCL1 to GCLn, and GWL1 to GWLn+1, the emission lines EML1 to EMLn, and the data lines DL1 to DLm. Each of the plurality of pixels PX may be electrically connected to four scan lines and one emission line. For example, as shown in FIG. 3, a first row of pixels may be connected to the scan lines GIL1, GCL1, GWL1, and GWL2 and the emission line EML1. As another example, a second row of pixels may be connected to the scan lines GIL2, GCL2, GWL2, and GWL3 and the emission line EML2.

Each of the plurality of pixels PX includes a light emitting element ED (e.g., see FIG. 5), and a pixel circuit PDC for controlling the emission of the light emitting element ED. The pixel driving circuit PDC may include one or more transistors, and one or more capacitors. The scan driver 300 and the light emitting driver 400 may include transistors formed through the same process as that of the pixel driving circuit PDC.

Each of the plurality of pixels PX receives the first driving voltage ELVDD, the second driving voltage ELVSS, the first initialization voltage VINT1, and the second initialization voltage VINT2 from the voltage generator 600.

Each of the sensors FX includes a light sensing element OPD (e.g., see FIG. 7) and a sensor driving circuit SDC. The sensor driving circuit SDC may include one or more transistors. The sensor driving circuit SDC may include the one or more transistors formed through the same process as that of the pixel driving circuit PDC. The sensor driver 700 may include transistors formed through the same process as those of the sensor driving circuit SDC and the pixel driving circuit PDC.

Each of the sensors FX may be connected to one corresponding sensor scan line from among the sensor scan lines SL1 to SLn, and one corresponding readout line from among the readout lines RL1 to RLm. In an embodiment, the number of sensors FX may be the same or substantially the same as the number of the pixels PX. However, the present disclosure is not limited thereto. In an embodiment, the number of sensors FX positioned at (e.g., in or on) the display panel DP may be less than the number of pixels PX.

The readout circuit 500 receives a readout control signal RCS from the driving controller 100. The readout circuit 500 may receive a detection signal from the readout lines RL1 to RLm in response to the readout control signal RCS, and may provide a readout signal FSS to the driving controller 100. In a touch detection mode, the readout signal FSS provided from the readout circuit 500 to the driving controller 100 may be a signal indicating a user's touch location. In a fingerprint detection mode, the readout signal FSS provided from the readout circuit 500 to the driving controller 100 may be a fingerprint detection signal corresponding to a user's fingerprint.

The readout circuit 500 may provide a reset signal RST (e.g., see FIG. 7) to the sensors FX. In an embodiment, the sensor driver 700 may provide the reset signal RST (e.g., see FIG. 7), instead of the readout circuit 500.

In the example shown in FIG. 3, the scan driver 300 and the sensor driver 700 are arranged opposite to the light emitting driver 400 with the pixels PX interposed therebetween, but the present disclosure is not limited thereto. For example, the scan driver 300, the sensor driver 700, and the light emitting driver 400 may be positioned to be adjacent to each other on one of the first side or the second side of the display panel DP. In an embodiment, the scan driver 300, the sensor driver 700, and the light emitting driver 400 may be implemented with one circuit. In an embodiment, the sensor driver 700 and the light emitting driver 400 may be arranged to be adjacent to each other on the first side of the display panel DP, and the scan driver 300 may be arranged on the second side of the display panel DP. In other words, the sensor driver 700 and the light emitting driver 400 may be arranged opposite to the scan driver 300 with the pixels PX interposed therebetween.

Figure 4A:
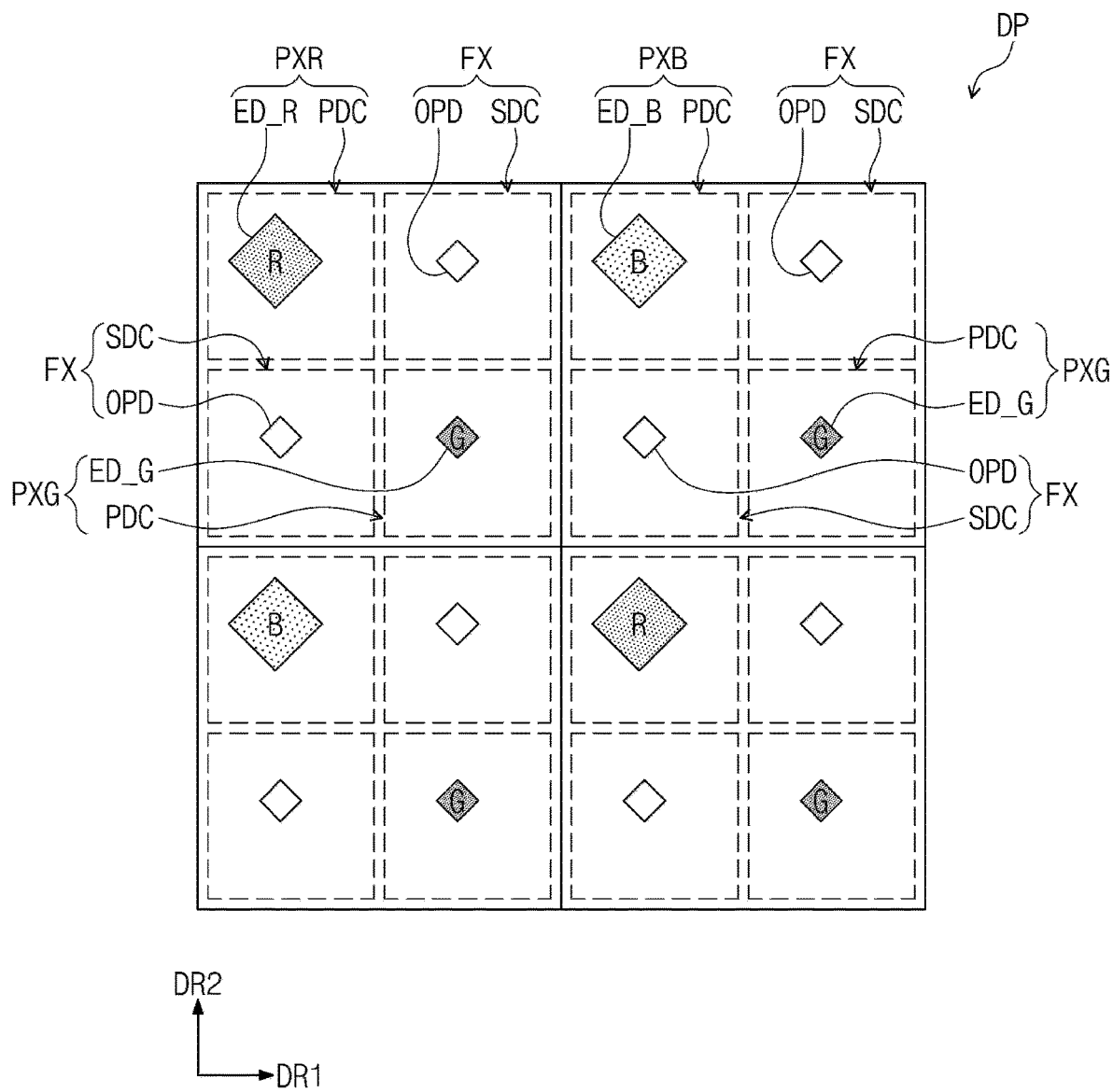
FIGS. 4A and 4B are enlarged plan views of a partial area of a display panel, according to embodiments of the present disclosure.
Figure 4B:
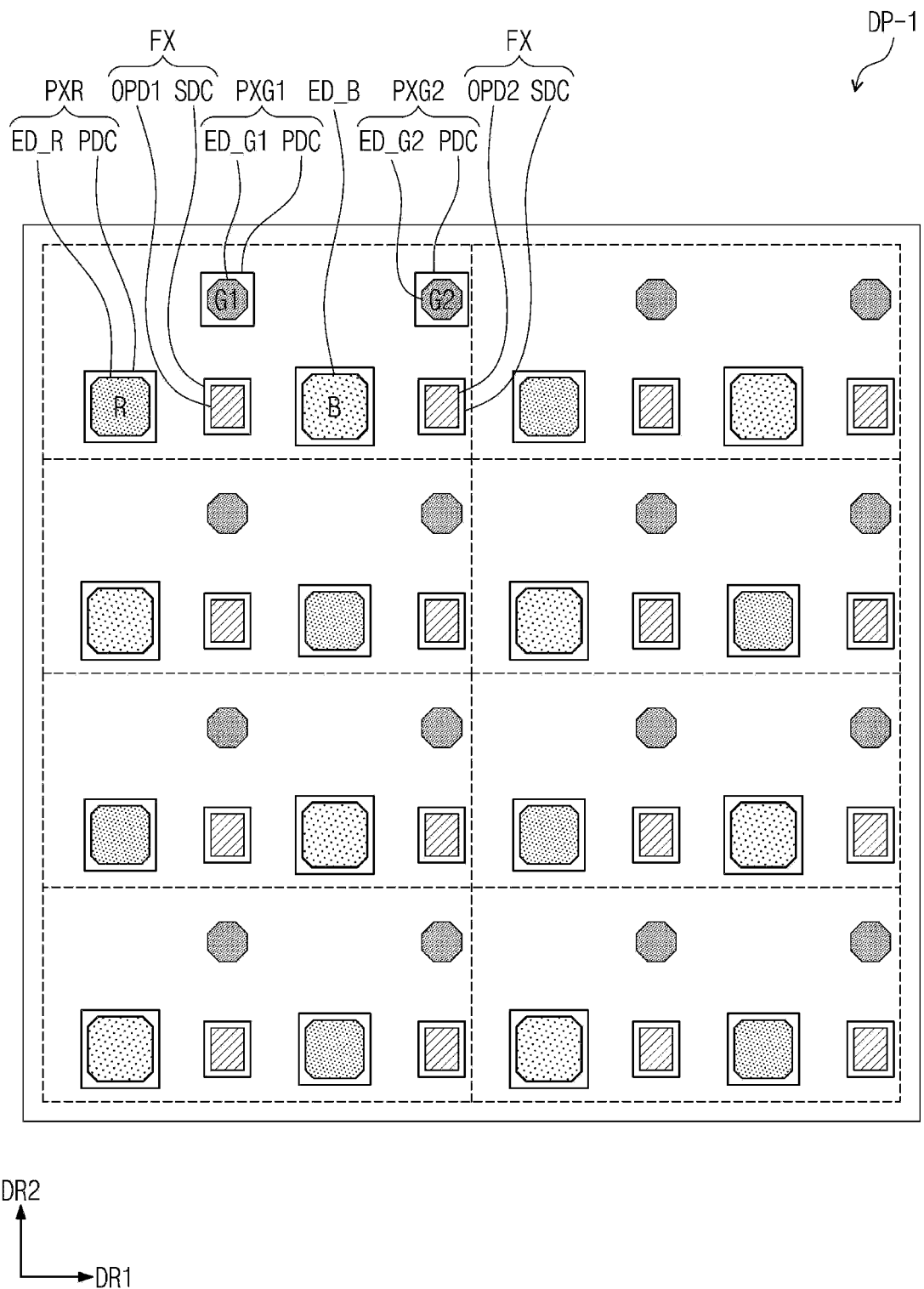

FIGS. 4A and 4B are enlarged plan views of a partial area of a display panel, according to embodiments of the present disclosure.

Referring to FIGS. 4A and 4B, pixels PXR, PXG, and PXB are arranged on the display panel DP. The pixel PXR includes a light emitting element ED_R and the pixel driving circuit PDC. The pixel PXG includes a light emitting element ED_G and the pixel driving circuit PDC. The pixel PXB includes a light emitting element ED_B and the pixel driving circuit PDC. Each of the sensors FX includes the light sensing element OPD and the sensor driving circuit SDC.

Referring to FIG. 4A, the pixels PXR, PXG, and PXB and the sensors FX are alternately arranged along the first direction DR1, and alternately arranged along the second direction DR2. The pixels PXR, PXG, and PXB include a first pixel PXR including the light emitting element (hereinafter referred to as a "red light emitting element") ED_R for outputting light of a first color (e.g., red (R)), a second pixel PXG including the light emitting element (hereinafter referred to as a "green light emitting element") ED_G for outputting light of a second color (e.g., green (G)), and a third pixel PXB including the light emitting element (hereinafter referred to as a "blue light emitting element") ED_B for outputting light of a third color (e.g., blue (B)).

As shown in FIG. 4A, the first pixels PXR and the third pixels PXB may be alternately and repeatedly arranged along the second direction DR2 and the first direction DR1. The second pixels PXG may be arranged along the first direction DR1 and the second direction DR2.

Each of the sensors FX may be positioned between corresponding ones of the first pixels PXR and the third pixels PXB to be adjacent to each other in the first and second directions DR1 and DR2. Further, each of the sensors FX may be positioned between two corresponding second pixels PXG in the first and second directions DR1 and DR2.

The arrangement structure of the pixels PX and the sensors FX is not limited to that illustrated in FIG. 4A, and may be variously modified as needed or desired.

As an example, the red light emitting element ED_R may have a size greater than that of the green light emitting element ED_G. Furthermore, the blue light emitting element ED_B may have a size greater than or equal to that of the red light emitting element ED_R. The size of each of the light emitting elements ED_R, ED_G, and ED_B is not limited thereto, and may be variously modified and applied. For example, in an embodiment of the present disclosure, the light emitting elements ED_R, ED_G, and ED_B may have the same or substantially the same size as one another.

Furthermore, it is illustrated that each of the light emitting elements ED_R, ED_G, and ED_B has a quadrangle shape. However, the present disclosure is not limited thereto. For example, the shape of each of the light emitting elements ED_R, ED_G, and ED_B may be variously modified as need or desired, for example, such as into a polygon, a circle, an oval, or the like. As another example, the shapes of the light emitting elements ED_R, ED_G, and ED_B may be different from one another. For example, the green light emitting element ED_G may have a circular shape, and the red and blue light emitting elements ED_R and ED_B may have a quadrangle shape.

In an embodiment, an area size occupied by the sensor driving circuit SDC may be smaller than an area size occupied by the pixel driving circuit PDC.

Referring to FIG. 4B, in the first and second directions DR1 and DR2, the red light emitting elements ED_R and the blue light emitting elements ED_B may be arranged alternately and repeatedly. First green light emitting elements ED_G1 may be arranged along the second direction DR2. Second green light emitting elements ED_G2 may be arranged along the second direction DR2. The first green light emitting elements ED_G1 and the second green light emitting elements ED_G2 may be arranged on different columns from each other. The first and second green light emitting elements ED_G1 and ED_G2 may be alternately arranged along the first direction DR1. The first and second green light emitting elements ED_G1 and ED_G2 may be arranged in rows and columns that are different from rows and columns in which the red light emitting elements ED_R and the blue light emitting elements ED_B are arranged in the first and second direction DR1 and DR2.

As an example of the present disclosure, the red light emitting element ED_R may have a size greater than those of the first and second green light emitting elements ED_G1 and ED_G2. The blue light emitting element ED_B may have a size greater than or equal to that of the red light emitting element ED_R. The size of each of the light emitting elements ED_R, ED_G1, ED_G2, and ED_B is not limited thereto, and may be variously modified and applied. For example, in another embodiment of the present disclosure, the light emitting elements ED_R, ED_G1, ED_G2, and ED_B may have the same or substantially the same size as one another.

The first and second green light emitting elements ED_G1 and ED_G2 may have the same or substantially the same shapes as those of the red and blue light emitting elements ED_R and ED_B. As an example, each of the red and blue light emitting elements ED_R and ED_B may have an octagonal shape in which a length in the first direction DR1 is the same or substantially the same as a length in the second direction DR2. In other words, the red and blue light emitting elements ED_R and ED_B may have a size that is the same as or different from each other, but may have the same or substantially the same shape as each other.

Each of the first and second green light emitting elements ED_G1 and ED_G2 may have an octagonal shape in which the length in the first direction DR1 is the same or substantially the same as the length in the second direction DR2. As an example, the first and second green light emitting elements ED_G1 and ED_G2 have the same or substantially the same size and shape as each other. However, the shape of each of the light emitting elements ED_R, ED_G1, ED_G2, and ED_B is not limited thereto. The shape of each of the light emitting elements ED_R, ED_G1, ED_G2, and ED_B may be variously modified as needed or desired.

Figure 5:
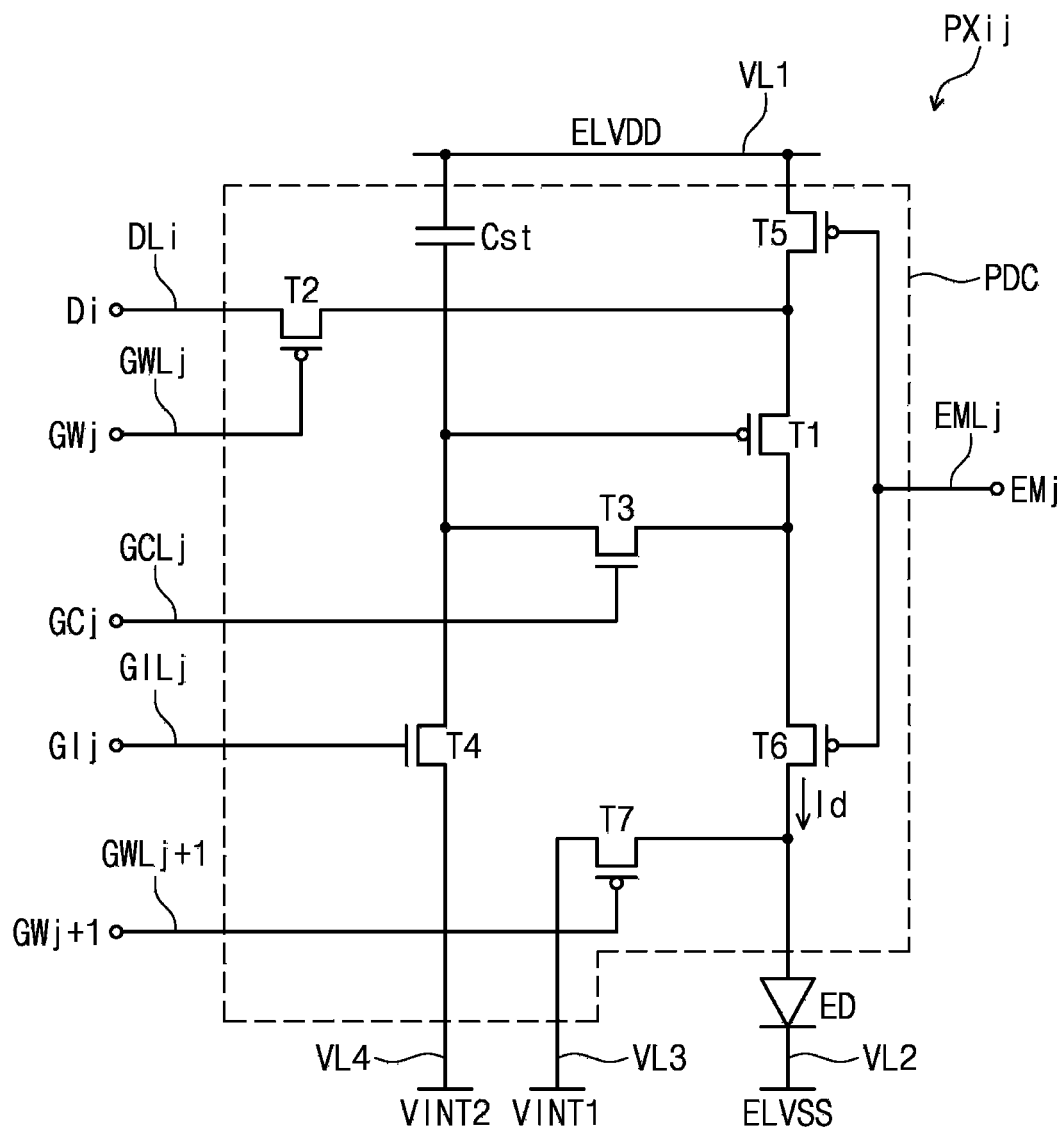
FIG. 5 is a circuit diagram of a pixel, according to an embodiment of the present disclosure.

FIG. 5 is a circuit diagram of a pixel, according to an embodiment of the present disclosure.

FIG. 5 illustrates one pixel PXij from among the pixels PX illustrated in FIG. 3. Each of the plurality of pixels PX shown in FIG. 3 may have the same or substantially the same circuit configuration as that of the pixel PXij shown in FIG. 5.

Referring to FIG. 5, the pixel PXij includes the pixel driving circuit PDC, and at least one light emitting element ED. The light emitting element ED may be a light emitting diode. As an example, the light emitting element ED may be an organic light emitting diode including an organic light emitting layer. The pixel driving circuit PDC according to an embodiment includes first to seventh transistors T1, T2, T3, T4, T5, T6, and T7, and one capacitor Cst.

The third and fourth transistors T3 and T4 of the first to seventh transistors T1 to T7 may be N-type transistors that use an oxide semiconductor as a semiconductor layer. Each of the first, second, fifth, sixth, and seventh transistors T1, T2, T5, T6, and T7 may be P-type transistors that have a low-temperature polycrystalline silicon (LTPS) semiconductor layer. However, the present disclosure is not limited thereto. In an embodiment, all of the first to seventh transistors T1 to T7 may be P-type transistors. In an embodiment, all of the first to seventh transistors T1 to T7 may be N-type transistors. In an embodiment, at least one of the first to seventh transistors T1 to T7 may be an N-type transistor, and the others thereof may be P-type transistors. A configuration of the pixel driving circuit PDC is not limited to that of the embodiment illustrated in FIG. 5. The pixel driving circuit PDC illustrated in FIG. 5 is provided as an example. For example, the configuration of the pixel driving circuit PDC may be variously modified and implemented as needed or desired.

The pixel PXij is electrically connected to the scan lines GILj, GCLj, GWLj, and GWLj+1, the emission line EMLj, and the data line DLi. The scan lines GILj, GCLj, GWLj, and GWLj+1 may deliver scan signals GIj, GCj, GWj, and GWj+1, respectively, and the emission line EMLj may deliver an emission control signal EMj. The data line DLi transfers a data signal Di. The data signal Di may have a voltage level corresponding to the input image signal RGB that is input to the display device DD (e.g., see FIG. 3). First to fourth driving voltage lines VL1, VL2, VL3, and VL4 may deliver the first driving voltage ELVDD, the second driving voltage ELVSS, the first initialization voltage VINT1, and the second initialization voltage VINT2, respectively.

The first transistor T1 includes a first electrode connected with the first driving voltage line VL1 through the fifth transistor T5, a second electrode electrically connected with an anode of the light emitting element ED through the sixth transistor T6, and a gate electrode connected with one end of the capacitor Cst. The first transistor T1 may receive the data signal Di delivered through the data line DLi depending on a switching operation of the second transistor T2, and may supply a driving current Id to the light emitting element ED.

The second transistor T2 includes a first electrode connected to the data line DLi, a second electrode connected to the first electrode of the first transistor T1, and a gate electrode connected to the scan line GWLj. The second transistor T2 may be turned on in response to the scan signal GWj received through the scan line GWLj, and may deliver the data signal Di delivered from the data line DLi to the first electrode of the first transistor T1.

The third transistor T3 includes a first electrode connected to the gate electrode of the first transistor T1, a second electrode connected to the second electrode of the first transistor T1, and a gate electrode connected to the scan line GCLj. The third transistor T3 may be turned on in response to the scan signal GCj received through the scan line GCLj, and thus, the gate electrode and the second electrode of the first transistor T1 may be connected to each other, or in other words, the first transistor T1 may be diode-connected.

The fourth transistor T4 includes a first electrode connected with the gate electrode of the first transistor T1, a second electrode connected with the fourth driving voltage line VL4 through which the second initialization voltage VINT2 is transferred, and a gate electrode connected with the scan line GILj. The fourth transistor T4 may be turned on in response to the scan signal GIj transferred through the scan line GILj, such that the second initialization voltage VINT2 is transferred to the gate electrode of the first transistor T1. As such, a voltage of the gate electrode of the first transistor T1 may be initialized. This operation may be referred to as an "an initialization operation".

The fifth transistor T5 includes a first electrode connected to the first driving voltage line VL1, a second electrode connected to the first electrode of the first transistor T1, and a gate electrode connected to the emission line EMLj.

The sixth transistor T6 includes a first electrode connected with the second electrode of the first transistor T1, a second electrode connected with the anode of the light emitting element ED, and a gate electrode connected with the emission line EMLj.

The fifth transistor T5 and the sixth transistor T6 may be concurrently (e.g., simultaneously or substantially simultaneously) turned on with each other in response to the emission control signal EMj transferred through the emission line EMLj. As such, the first driving voltage ELVDD may be compensated through the diode-connected transistor T1, so as to be supplied to the light emitting element ED.

The seventh transistor T7 includes a first electrode connected to the anode of the light emitting element ED, a second electrode connected to the third voltage line VL3, and a gate electrode connected to the scan line GWLj+1. The seventh transistor T7 is turned on in response to the scan signal GWj+1 received through the scan line GWLj+1 to electrically connect the anode of the light emitting element ED and the third voltage line VL3.

One end of the capacitor Cst is connected to the gate electrode of the first transistor T1, and another end of the capacitor Cst is connected to the first driving voltage line VL1. The cathode of the light emitting element ED may be connected to the second driving voltage line VL2, through which the second driving voltage ELVSS is delivered. The structure of the pixel PXij is not limited to the structure illustrated in FIG. 5. For example, the number of transistors included in one pixel PXij, the number of capacitors included in the one pixel PXij, and the connection relationship between the transistors and the capacitors may be variously modified as needed or desired.

Figure 6:
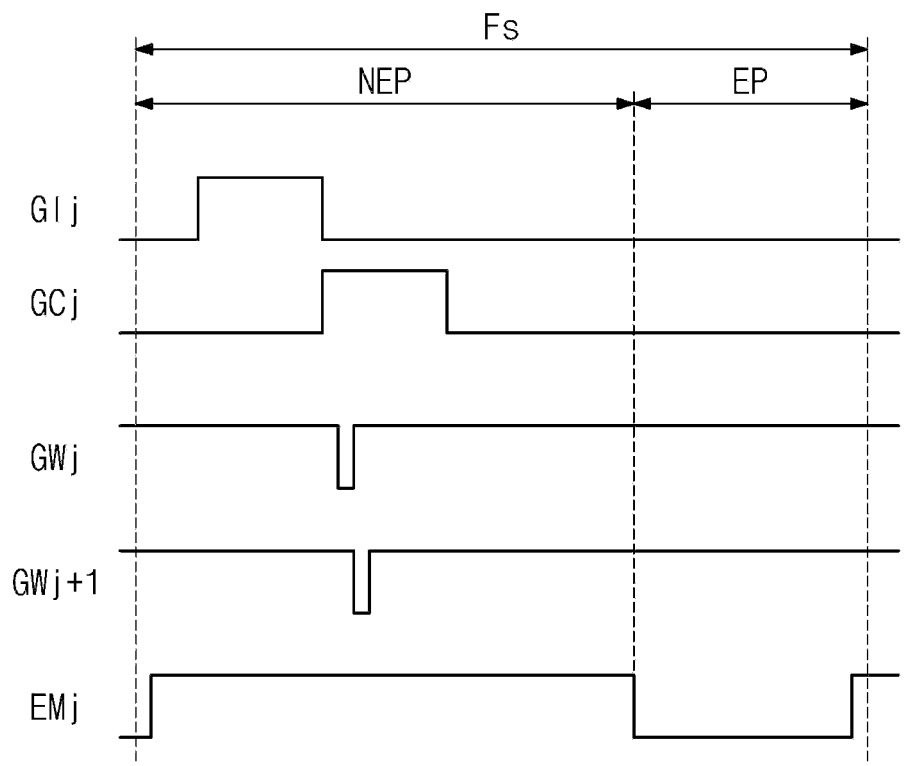
FIG. 6 is a timing diagram illustrating an operation of a pixel illustrated in FIG. 5.

FIG. 6 is a timing diagram illustrating an operation of the pixel illustrated in FIG. 5.

Referring to FIGS. 5 and 6, one frame Fs may include an emission period EP and a non-emission period NEP. The emission period EP may correspond to a low-level period (e.g., an active period) of the emission control signal EMj. The non-emission period NEP may correspond to a high-level period (e.g., an inactive period) of the emission control signal EMj.

The non-emission period NEP may include an initialization period and a data programming and compensation period.

When the scan signal GIj having a high level is provided through the scan line GILj during the initialization period, the fourth transistor T4 is turned on. The second initialization voltage VINT2 is delivered to the gate electrode of the first transistor T1 through the fourth transistor T4, so as to initialize the first transistor T1.

Next, when the scan signal GCj having a high level is supplied through the scan line GCLj during the data programming and compensation period, the third transistor T3 is turned on. The first transistor T1 is diode-connected by the third transistor T3, and thus, is turned on to be forward-biased. At this time, when the scan signal GWj having a low level is supplied through the scan line GWLj, the second transistor T2 is turned on. In this case, a compensation voltage, which is obtained by reducing the voltage of the data signal Di supplied from the data line DLi by a threshold voltage of the first transistor T1, is applied to the gate electrode of the first transistor T1. In other words, a gate voltage applied to the gate electrode of the first transistor T1 may be a compensation voltage.

As the first driving voltage ELVDD and the compensation voltage are respectively applied to opposite ends of the capacitor Cst, a charge corresponding to a difference between the first driving voltage ELVDD and the compensation voltage may be stored in the capacitor Cst.

In the meantime, the seventh transistor T7 is turned on in response to the scan signal GWj+1 having a low level that is delivered through the scan line GWLj+1. As the seventh transistor T7 is turned on, the anode of the light emitting element ED is electrically connected to the third driving voltage line VL3. Accordingly, the anode of the light emitting element ED may be initialized to the first initialization voltage VINT1.

Next, during the emission period EP, the emission control signal EMj supplied from the emission line EMLj is changed from a high level to a low level. During the emission period EP, the fifth transistor T5 and the sixth transistor T6 are turned on by the emission control signal EMj having a low level. In this case, the driving current Id, according to a voltage difference between the gate voltage of the gate electrode of the first transistor T1 and the first driving voltage ELVDD, is generated and supplied to the light emitting element ED through the sixth transistor T6, and the driving current Id flows through the light emitting element ED. The light emitting element ED may emit light having a luminance corresponding to the driving current Id.

Figure 7:
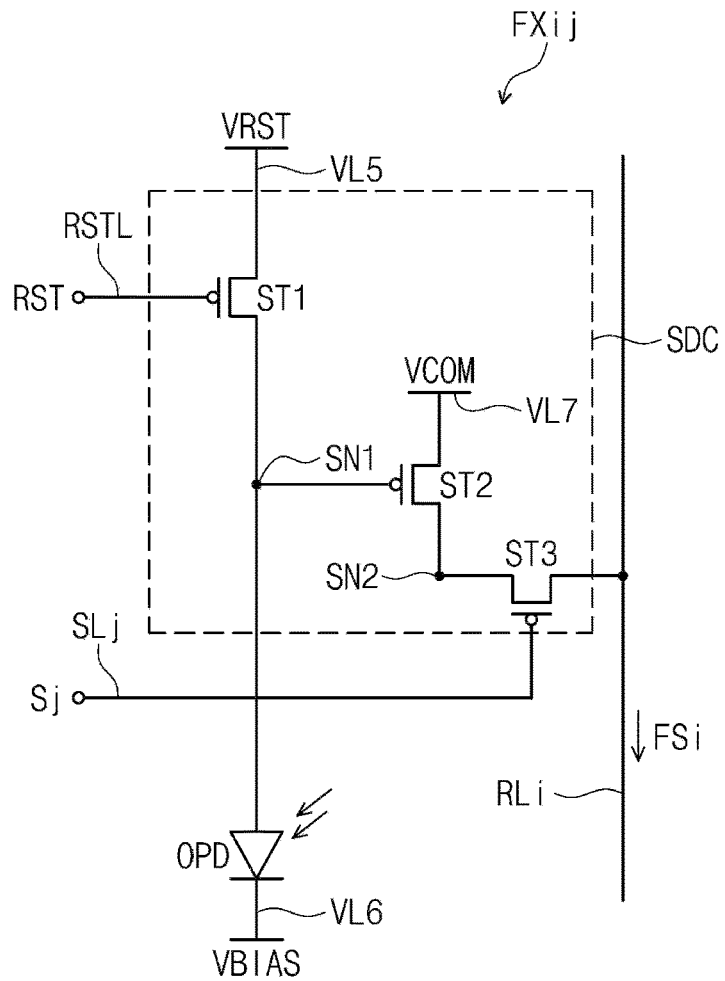
FIG. 7 is a circuit diagram of a sensor, according to an embodiment of the present disclosure.

FIG. 7 is a circuit diagram of a sensor, according to an embodiment of the present disclosure.

FIG. 7 shows one sensor FXij from among the plurality of sensors FX shown in FIG. 3. Each of the plurality of sensor FX shown in FIG. 3 may have the same or substantially the same circuit configuration as that of the sensor FXij shown in FIG. 7.

The sensor FXij is electrically connected to a sensor scan line SLj, a reset line RSTL, and a readout line RLi.

The sensor FXij includes the light sensing element OPD and the sensor driving circuit SDC. The light sensing element OPD may be a photodiode. As an example, the light sensing element OPD may be an organic photodiode including an organic material as a photoelectric conversion layer. An anode of the light sensing element OPD may be connected to a first sensing node SN1, and a cathode thereof may be connected to a sixth driving voltage line VL6 for transferring the bias voltage VBIAS. In an embodiment, the bias voltage VBIAS may be the same voltage as the second driving voltage ELVSS provided to the cathode of the light emitting element ED shown in FIG. 5.

The sensor driving circuit SDC includes three transistors ST1 to ST3. The three transistors ST1 to ST3 may include a reset transistor ST1, a amplification transistor ST2, and an output transistor ST3. Some of the reset transistor ST1, the amplification transistor ST2, and the output transistor ST3 may be P-type transistors, and the other(s) thereof may be an N-type transistor(s). In an embodiment, each of the reset transistor ST1, the amplification transistor ST2, and the output transistor ST3 may be a P-type transistor like the first and second transistors T1 and T2 of the pixel PXij shown in FIG. 5.

The reset transistor ST1 includes a first electrode connected with a reset voltage line VL5 that receives the reset voltage VRST, a second electrode connected with the first sensing node SN1, and a gate electrode connected with a reset line RSTL that receives the reset signal RST. The reset transistor ST1 may reset a potential of the first sensing node SN1 to the reset voltage VRST in response to the reset signal RST. In an embodiment, the reset voltage VRST may have a voltage level lower than that of the bias voltage VBIAS.

The amplification transistor ST2 includes a first electrode connected with a seventh driving voltage line VL7 for receiving the sensor driving voltage VCOM, a second electrode connected with a second sensing node SN2, and a gate electrode connected with the first sensing node SN1. In an embodiment, the sensor driving voltage VCOM may have the same voltage level as that of one of the first driving voltage ELVDD, the first initialization voltage VINT1, or the second initialization voltage VINT2 that are provided to the pixel PXij shown in FIG. 5. The amplification transistor ST2 may provide a current corresponding to a potential of the first sensing node SN1 to the second sensing node SN2.

The output transistor ST3 includes a first electrode connected with the second sensing node SN2, a second electrode connected with the readout line RLi, and a gate electrode connected with the sensor scan line SLj for receiving the sensor scan signal Sj. The output transistor ST3 may output a sensing signal FSi to the readout line RLi in response to the sensor scan signal Sj.

The circuit configuration of the sensor driving circuit SDC is not limited to that illustrated in FIG. 7. The sensor driving circuit SDC illustrated in FIG. 7 is provided as an example, and the configuration of the sensor driving circuit SDC may be variously modified and implemented as needed or desired.

Figure 8:
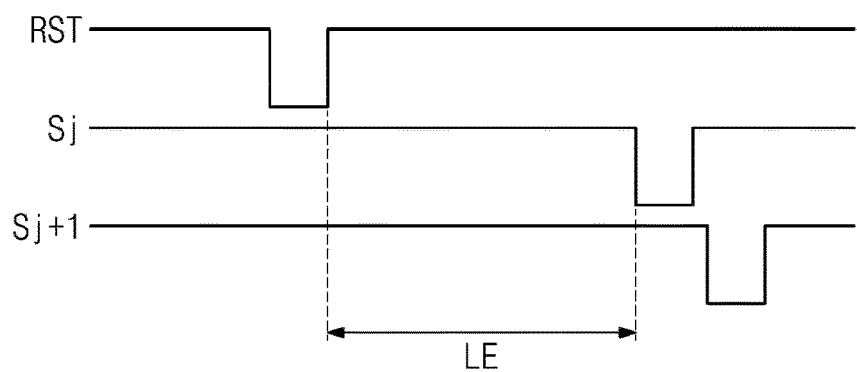
FIG. 8 is a timing diagram illustrating an operation of the sensor shown in FIG. 7.

FIG. 8 is a timing diagram illustrating an operation of the sensor shown in FIG. 7.

Referring to FIGS. 7 and 8, when the reset signal RST transitions to a low level, the reset transistor ST1 may be turned on, such that the first sensing node SN1 is initialized to the reset voltage VRST.

The sensor FXij is exposed to light during a light exposure period LE. When a user's hand touches the display surface, the light sensing element OPD may generate photocharges corresponding to light reflected by a ridge of a fingerprint and/or a valley between the ridges of the fingerprint, and the generated photocharges may be accumulated in the first sensing node SN1.

The amplification transistor ST2 may be a source follower amplifier that generates a source-drain current in proportion to the amount of charges of the first sensing node SN1 input to the gate electrode of the amplification transistor ST2.

While a sensor scan signal Sj is at an inactive level, or in other words, a high level, the output transistor ST3 is turned off. When the sensor scan signal Sj transitions to an active level, or in other words, a low level, the output transistor ST3 is turned on. When the output transistor ST3 is turned on, the sensing signal FSi corresponding to a current flowing through the amplification transistor ST2 may be output to the readout line RLi.

Figure 9:
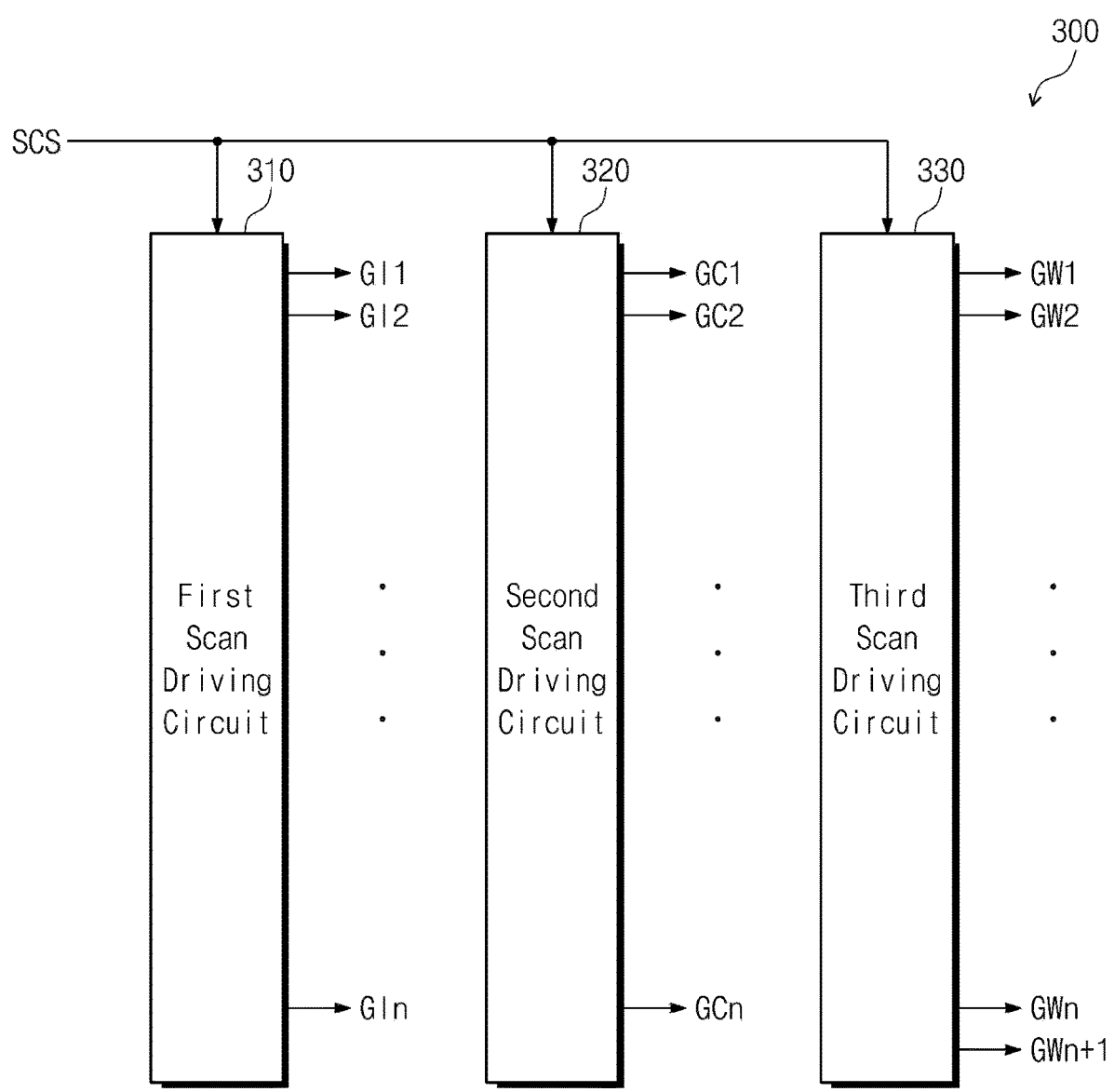
FIG. 9 is a block diagram showing a scan driver shown in FIG. 3.

FIG. 9 is a block diagram showing the scan driver 300 shown in FIG. 3.

Referring to FIG. 9, the scan driver 300 includes a first scan driving circuit 310, a second scan driving circuit 320, and a third scan driving circuit 330.

In response to the scan control signal SCS, the first scan driving circuit 310 outputs the scan signals Gil to Gin to be provided to the scan lines GIL1 to GILn shown in FIG. 3.

In response to the scan control signal SCS, the second scan driving circuit 320 outputs the scan signals GC1 to GCn to be provided to the scan lines GCL1 to GCLn shown in FIG. 3.

In response to the scan control signal SCS, the third scan driving circuit 330 outputs the scan signals GW1 to GWn+1 to be provided to the scan lines GWL1 to GWLn+1 shown in FIG. 3.

Figure 10:
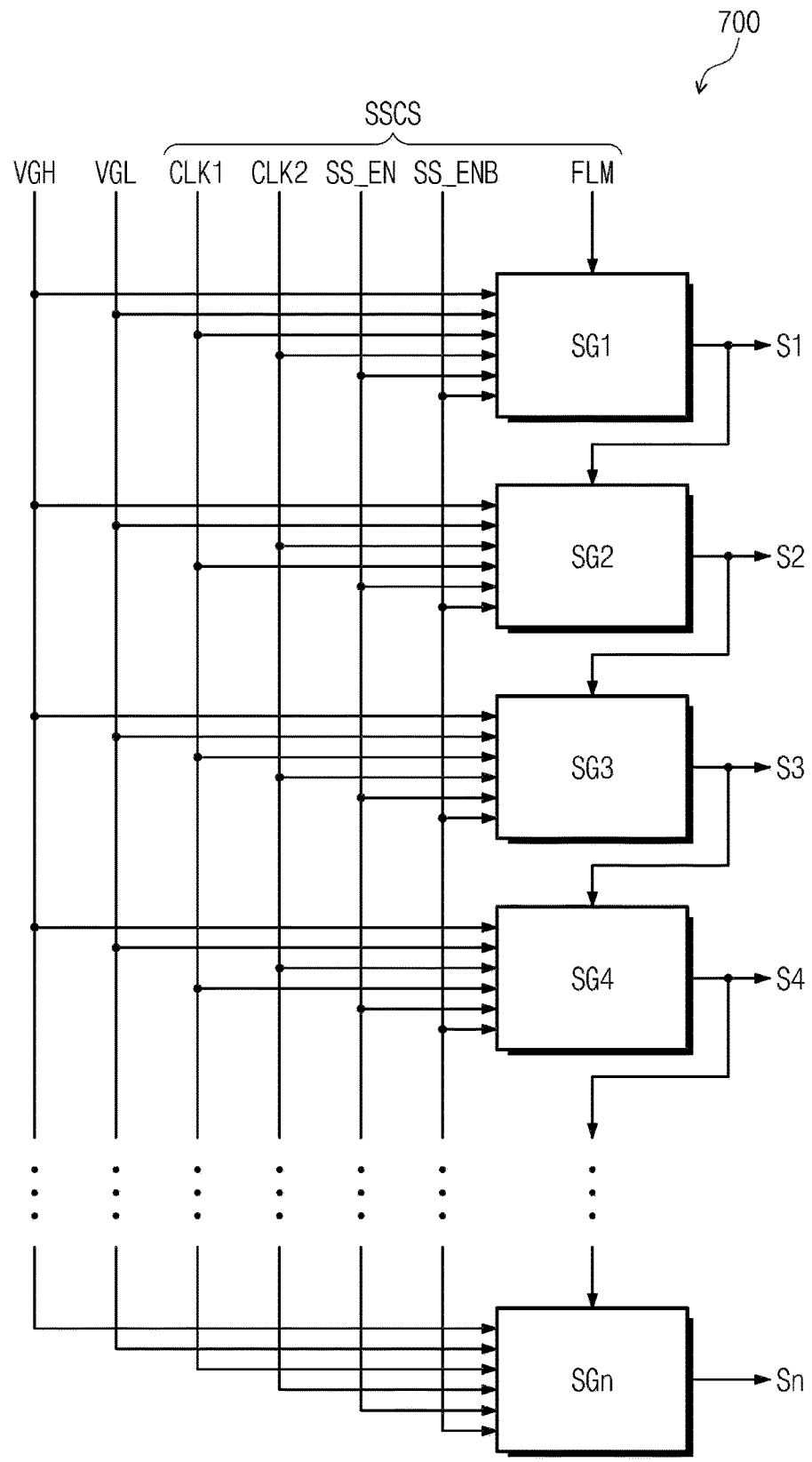
FIG. 10 is a block diagram showing a sensor driver shown in FIG. 3.

FIG. 10 is a block diagram showing a sensor driver shown in FIG. 3.

Referring to FIG. 10, the sensor driver 700 includes driving stages SG1 to SGn.

Each of the driving stages SG1 to SGn receives the sensor control signal SSCS from the driving controller 100 shown in FIG. 3. The sensor control signal SSCS includes a first clock signal CLK1, a second clock signal CLK2, a first enable signal SS_EN, a second enable signal SS_ENB, and a start signal FLM. Each of the driving stages SG1 to SGn receives a first voltage VGH and a second voltage VGL. The first voltage VGH and the second voltage VGL may be provided from the voltage generator 600 illustrated in FIG. 3.

In an embodiment, the driving stages SG1 to SGn output sensor scan signals S1 to Sn, respectively. The sensor scan signals S1 to Sn may be provided to the sensor scan lines SL1 to SLn shown in FIG. 3.

The driving stage (e.g., a first driving stage) SG1 may receive the start signal FLM as an input signal. Each of the driving stages SG1 to SGn has a dependent connection relationship indicating that a scan signal output from a previous driving stage is received as an input signal. For example, the sensor scan signal S1 output from the first driving stage SG1 from among the driving stages may be provided as an input signal to a second driving stage SG2. In other words, a j-th driving stage SGj may receive the sensor scan signal Sj−1 from a (j−1)-th driving stage SGj−1 as an input signal, but the present disclosure is not limited thereto. For example, the j-th driving stage SGj may receive a sensor scan signal Sj−k from a (j−k)-th driving stage SGj−k (where k is a positive integer) as an input signal.

Figure 11:
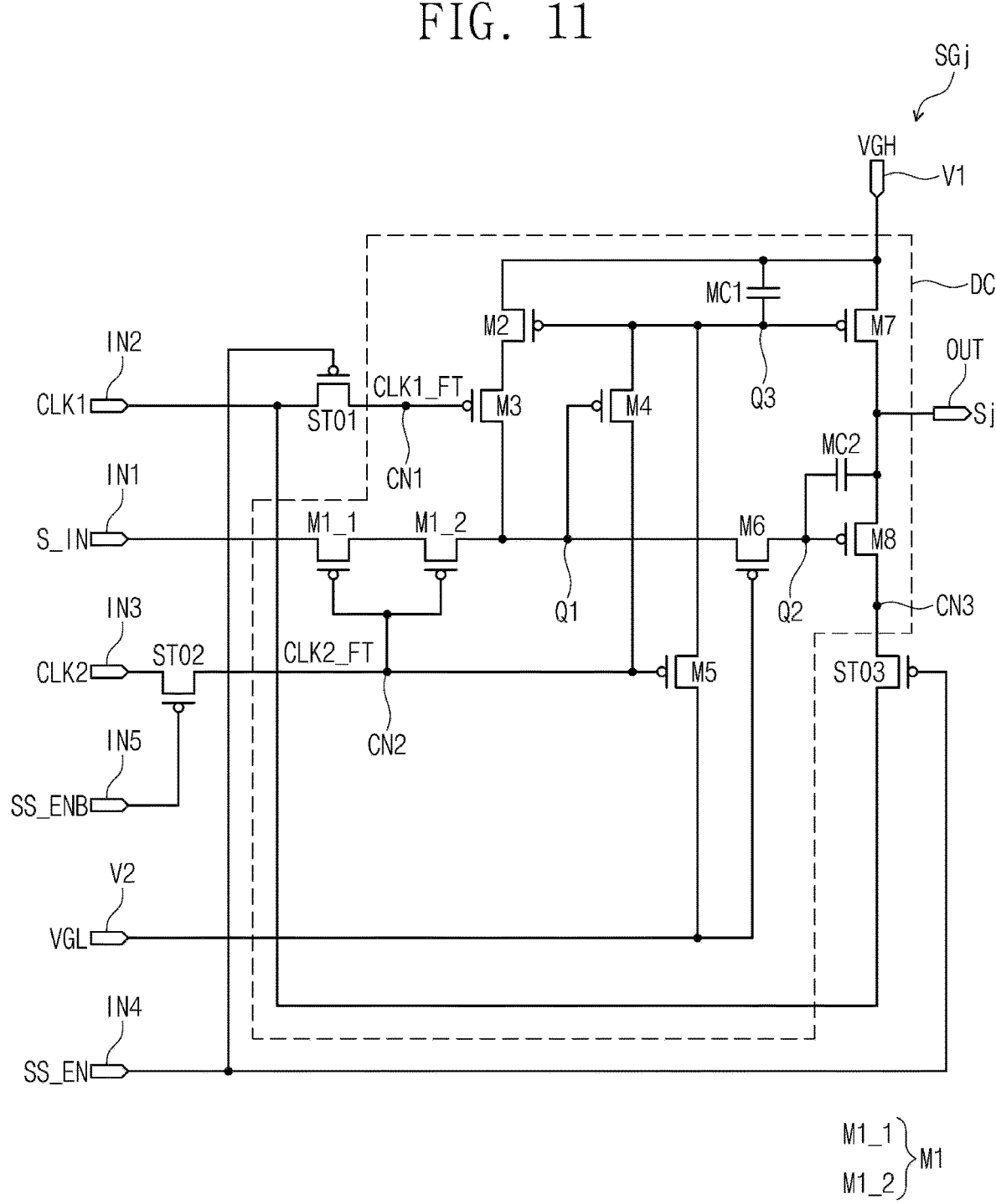
FIG. 11 is a circuit diagram showing a j-th driving stage in the sensor driver, according to an embodiment of the present disclosure.

FIG. 11 is a circuit diagram showing the j-th driving stage SGj in the sensor driver 700, according to an embodiment of the present disclosure.

FIG. 11 illustrates the j-th driving stage SGj (where j is a positive integer) from among the driving stages SG1 to SGn shown in FIG. 10. Each of the plurality of driving stages SG1 to SGn shown in FIG. 10 may include the same or substantially the same circuit configuration as that of the j-th driving stage SGj shown in FIG. 11. Hereinafter, the j-th driving stage SGj is referred to as a "driving stage SGj".

Referring to FIG. 11, the driving stage SGj includes a driving circuit DC and a switching circuit. The switching circuit may include first to third switching transistors ST01, ST02, and ST03.

The first switching transistor ST01 is connected between a second input terminal IN2 and a first clock node CN1, and includes a gate electrode connected to a fourth input terminal IN4. The first switching transistor ST01 transmits the first clock signal CLK1 to the first clock node CN1 in response to the first enable signal SS_EN. The first clock node CN1 may receive a first filtering clock signal CLK1_FT through the first switching transistor ST01.

The second switching transistor ST02 is connected between a third input terminal IN3 and a second clock node CN2, and includes a gate electrode connected to a fifth input terminal IN5. The second switching transistor ST02 transmits the second clock signal CLK2 to the second clock node CN2 in response to the second enable signal SS_ENB. The second clock node CN2 may receive a second filtering clock signal CLK2_FT through the second switching transistor ST02.

The third switching transistor ST03 is connected between a third clock node CN3 and the second input terminal IN2, and includes a gate electrode connected to the fourth input terminal IN4. The third switching transistor ST03 transmits the first clock signal CLK1 to the third clock node CN3 in response to the first enable signal SS_EN.

The first to third clock nodes CN1, CN2, and CN3 may be a part of the driving circuit DC.

The driving circuit DC may include first to eighth transistors M1, M2, M3, M4, M5, M6, M7, and M8, and first and second capacitors MC1 and MC2. The circuit configuration of the driving circuit DC in the driving stage SGj is not limited to that of the embodiment of FIG. 11. The driving circuit DC in the driving stage SGj shown in FIG. 11 is provided as an example, and the configuration of the driving circuit DC may be variously modified and implemented as needed or desired.

The first transistor M1 may include transistors M1_1 and M1_2. The transistors M1_1 and M1_2 are sequentially connected in series between a first input terminal IN1 and a first node Q1. The first transistor M1 transmits an input signal S_IN to the first node Q1 in response to the clock signal CLK2_FT of the second clock node CN2. When the driving stage SGj is the first driving stage SG1, the input signal S_IN may be the start signal FLM. When the driving stage SGj is one of the second to n-th driving stages SG2 to SGn, the input signal S_IN may be a sensor scan signal Sj−1 output from a corresponding previous driving stage SGj−1.

The second transistor M2 is connected between a first voltage input terminal V1 and the third transistor M3, and includes a gate electrode connected to a third node Q3. The third transistor M3 is connected between the second transistor M2 and the first node Q1, and includes a gate electrode connected to the first clock node CN1.

The fourth transistor M4 is connected between the third node Q3 and the second clock node CN2, and includes a gate electrode connected to the first node Q1. The fifth transistor M5 is connected between the third node Q3 and a second voltage input terminal V2, and includes a gate electrode connected to the second clock node CN2.

The sixth transistor M6 is connected between the first node Q1 and a second node Q2, and includes a gate electrode connected to the second voltage input terminal V2. The seventh transistor M7 is connected between the first voltage input terminal V1 and an output terminal OUT, and includes a gate electrode connected to the third node Q3. The eighth transistor M8 is connected between the output terminal OUT and the third clock node CN3, and includes a gate electrode connected to the second node Q2.

The first capacitor MC1 is connected between the first voltage input terminal V1 and the third node Q3. The second capacitor MC2 is connected between the output terminal OUT and the second node Q2.

The driving circuit DC may output the sensing scan signal Sj in response to the input signal S_IN, the first filtering clock signal CLK1_FT of the first clock node CN1, the second filtering clock signal CLK2_FT of the second clock node CN2, the first enable signal SS_EN, and the second enable signal SS_ENB.

Figure 12:
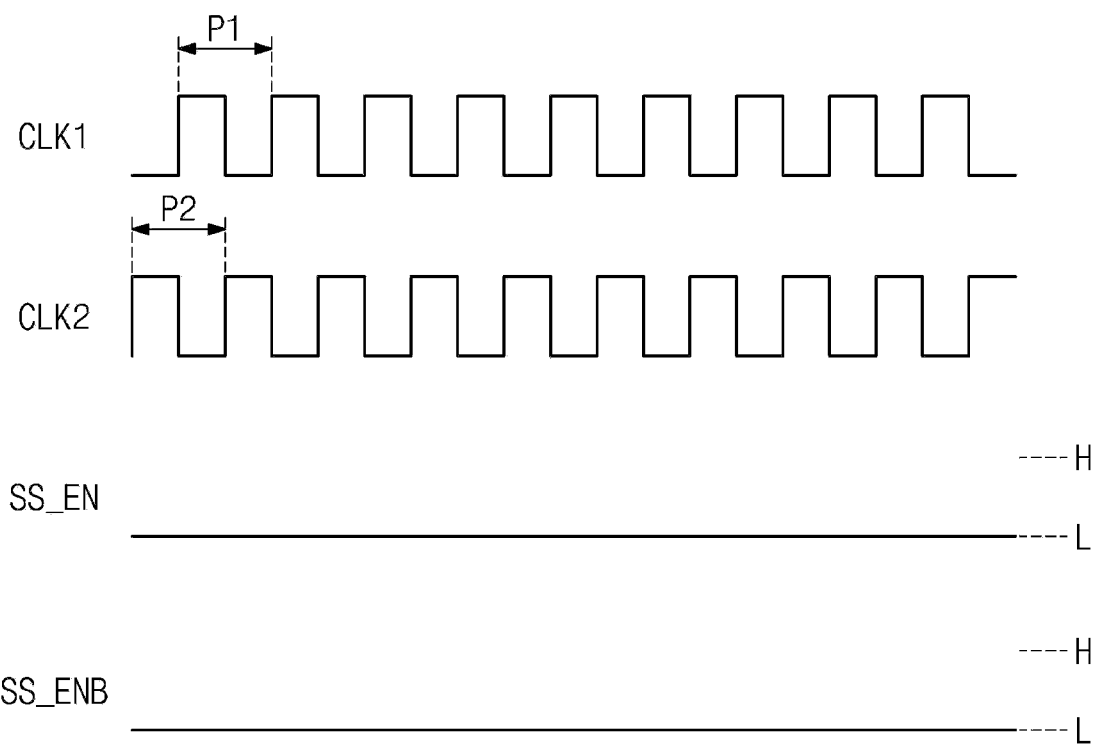
FIG. 12 is a timing diagram of signals provided to a driving stage shown in FIG. 11 when operating in a first detection mode.

FIG. 12 is a timing diagram of signals provided to the driving stage SGj shown in FIG. 11 when operating in a first detection mode.

Referring to FIG. 12, the first detection mode may be a touch detection mode in which the sensors FX shown in FIG. 3 detect a user's touch input. In the first detection mode, the first clock signal CLK1 and the second clock signal CLK2 may have the same or substantially the same frequency as each other and different phases from each other. In other words, a period P1 of the first clock signal CLK1 is the same or substantially the same as a period P2 of the second clock signal CLK2 (e.g., P1=P2).

In an embodiment, the first clock signal CLK1 and the second clock signal CLK2 may be complementary signals. In the first detection mode, both the first enable signal SS_EN and the second enable signal SS_ENB may have a low level.

When both the first enable signal SS_EN and the second enable signal SS_ENB have a low level, all of the first to third switching transistors ST01, ST02, and ST03 may be turned on.

Accordingly, the first filtering clock signal CLK1_FT of the first clock node CN1 may be the same or substantially the same as the first clock signal CLK1. The second filtering clock signal CLK2_FT of the second clock node CN2 may be the same or substantially the same as the second clock signal CLK2.

In the first detection mode, the driving circuit DC may operate in response to the first filtering clock signal CLK1_FT that is the same or substantially the same as the first clock signal CLK1, the second filtering clock signal CLK2_FT that is the same or substantially the same as the second clock signal CLK2, and the input signal S_IN.

Figure 13:
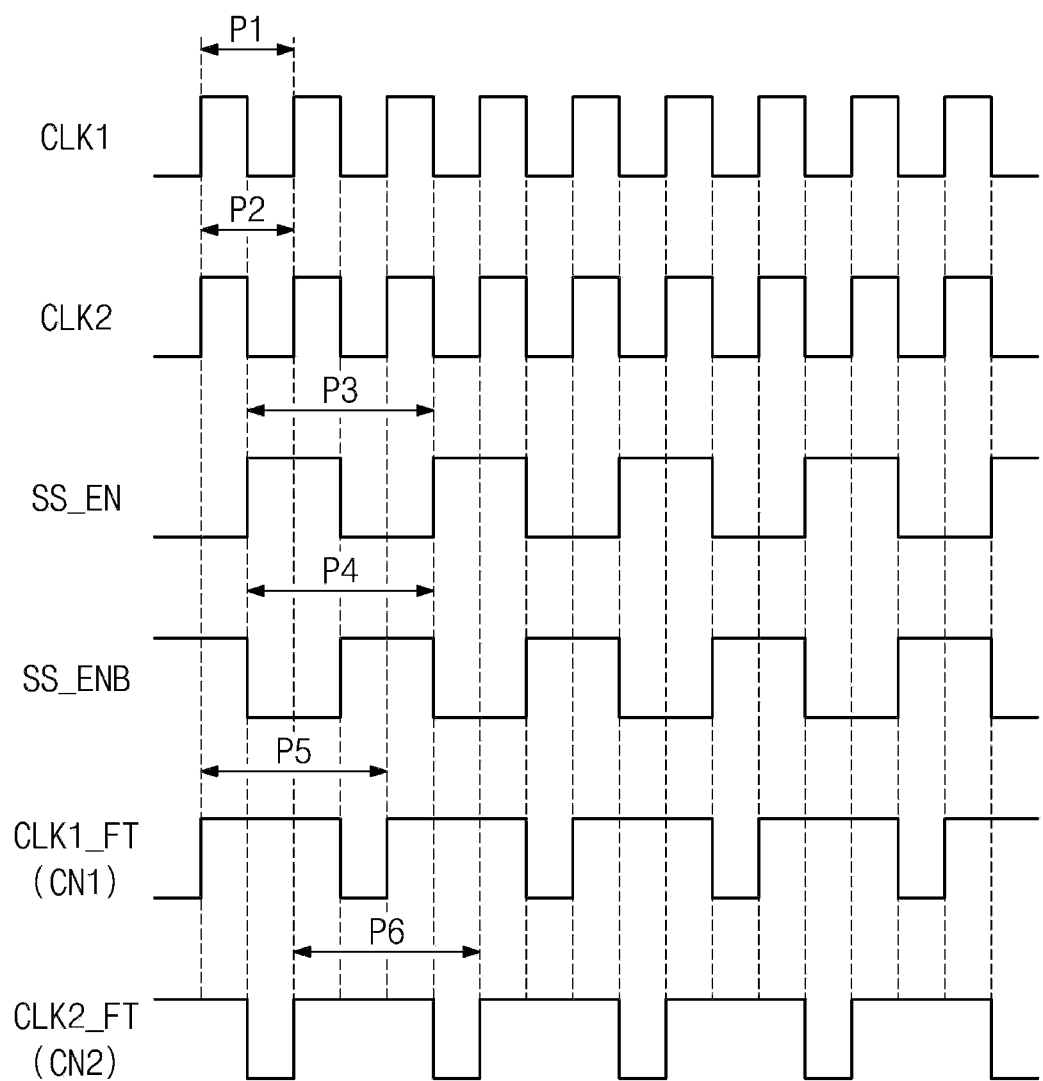
FIG. 13 is a timing diagram of signals provided to a driving stage shown in FIG. 11 when operating in a second detection mode.

FIG. 13 is a timing diagram of signals provided to the driving stage SGj shown in FIG. 11 when operating in a second detection mode.

Referring to FIG. 13, the second detection mode may be a fingerprint detection mode in which the sensors FX shown in FIG. 3 detect a user's biometric information (e.g., a fingerprint). In the second detection mode, the first clock signal CLK1 and the second clock signal CLK2 may be signals having the same or substantially the same frequency and the same or substantially the same phase as each other. In other words, a period P1 of the first clock signal CLK1 is the same or substantially the same as a period P2 of the second clock signal CLK2 (e.g., P1=P2).

In the second detection mode, the first enable signal SS_EN and the second enable signal SS_ENB may be signals having the same or substantially the same frequency as each other and different phases from each other. In other words, a period P3 of the first enable signal SS_EN is the same or substantially the same as a period P4 of the second enable signal SS_ENB (e.g., P3=P4).

In an embodiment, the first enable signal SS_EN and the second enable signal SS_ENB may be complementary signals. In an embodiment, a frequency of each of the first enable signal SS_EN and the second enable signal SS_ENB may be lower than a frequency of each of the first clock signal CLK1 and the second clock signal CLK2. For example, when the frequency of each of the first clock signal CLK1 and the second clock signal CLK2 is 240 Hz, a frequency of each of the first enable signal SS_EN and the second enable signal SS_ENB may be 120 Hz. In other words, the period P3 of the first enable signal SS_EN and the period P4 of the second enable signal SS_ENB are longer than the period P1 of the first clock signal CLK1 and the period P2 of the second clock signal CLK2.

The first switching transistor ST01 may be turned on when the first enable signal SS_EN is at a low level. In other words, in the case where the first clock signal CLK1 is at a low level when the first enable signal SS_EN is at a low level, the first filtering clock signal CLK1_FT is also at a low level. When at least one of the first enable signal SS_EN or the first clock signal CLK1 is at a high level, the first filtering clock signal CLK1_FT is at a high level.

As a result, the frequency of the first filtering clock signal CLK1_FT of the first clock node CN1 is ½ of the frequency of the first clock signal CLK1. In other words, a period P5 of the first filtering clock signal CLK1_FT is twice the period P1 of the first clock signal CLK1.

When the second enable signal SS_ENB is at a low level, the second switching transistor ST02 may be turned on. In other words, in the case where the second clock signal CLK2 is at a low level when the second enable signal SS_ENB is at a low level, the second filtering clock signal CLK2_FT may also be at a low level. When at least one of the second enable signal SS_ENB or the second clock signal CLK2 is at a high level, the second filtering clock signal CLK2_FT is at a high level.

As a result, the frequency of the second filtering clock signal CLK2_FT of the second clock node CN2 is ½ of the frequency of the second clock signal CLK2. In other words, a period P6 of the second filtering clock signal CLK2_FT is twice the period P2 of the second clock signal CLK2.

As illustrated in FIG. 12, in the first detection mode, when both the first enable signal SS_EN and the second enable signal SS_ENB are at a low level, the driving circuit DC may operate in response to the first clock signal CLK1 and the second clock signal CLK2. Accordingly, the driving circuit DC may operate at the first operating frequency (e.g., 240 Hz), which is the frequency of the first clock signal CLK1 or the second clock signal CLK2.

As illustrated in FIG. 13, in the second detection mode, the driving circuit DC may operate in response to the first filtering clock signal CLK1_FT and the second filtering clock signal CLK2_FT. Accordingly, the driving circuit DC may operate at a second operating frequency (e.g., 120 Hz), which is the frequency of the first filtering clock signal CLK1_FT or the second filtering clock signal CLK2_FT.

In the first detection mode for detecting the user's touch input, as an operating frequency is relatively higher, the touch sensitivity may be improved. In the second detection mode for detecting the user's fingerprint, light may be received during a time (e.g., a predetermined time) to accurately obtain information based on a difference between a ridge and a valley of a fingerprint.

In the first detection mode (e.g., a touch detection mode), the driving circuit DC may operate at a first operating frequency. In the second detection mode (e.g., a fingerprint detection mode), the driving circuit DC may operate at a second operating frequency lower than the first operating frequency.

Figure 14:
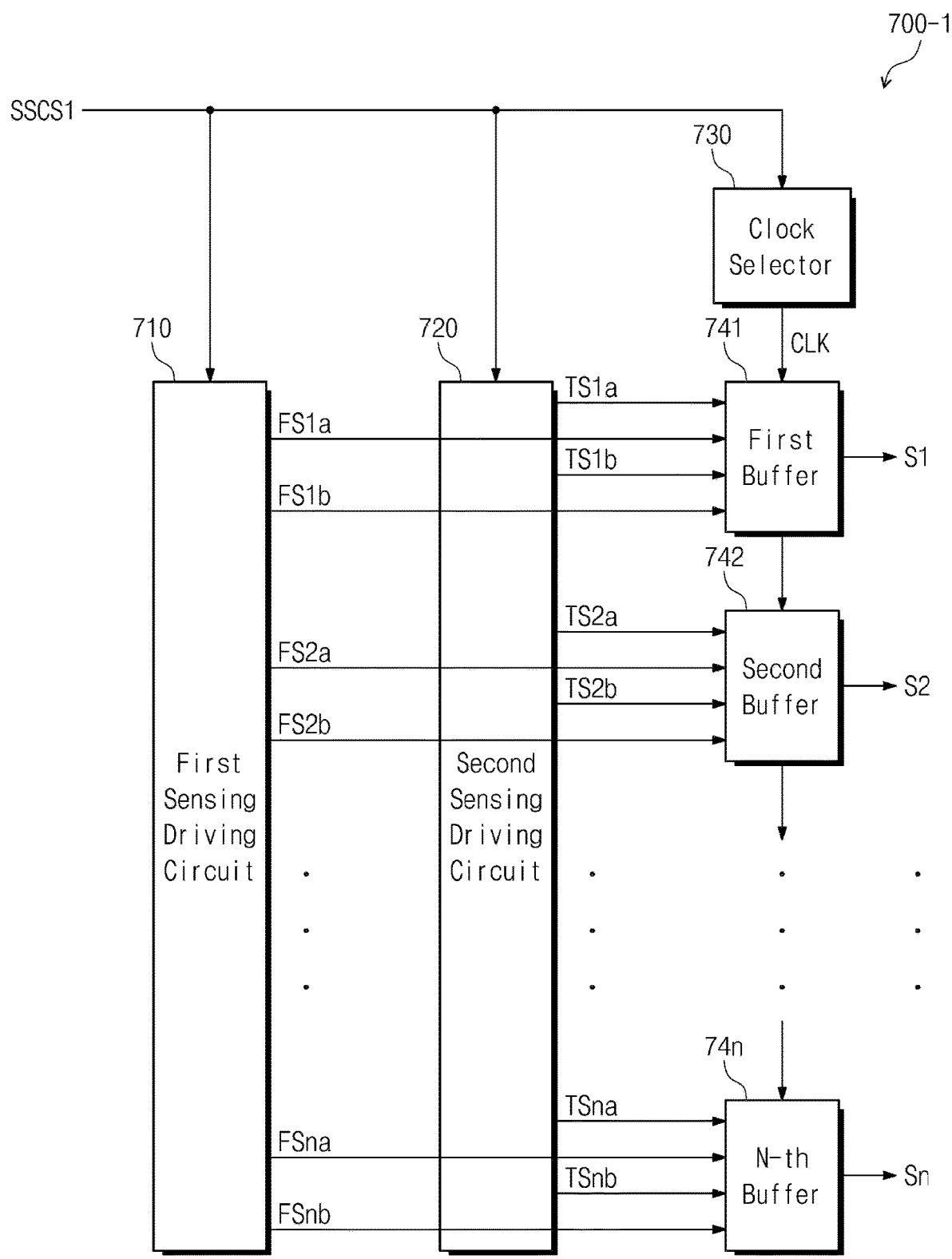
FIG. 14 is a block diagram showing a sensor driver, according to an embodiment of the present disclosure.

FIG. 14 is a block diagram showing a sensor driver 700-1, according to an embodiment of the present disclosure.

Referring to FIG. 14, the sensor driver 700-1 includes a first sensing driving circuit 710, a second sensing driving circuit 720, a clock selector 730, and first to n-th buffers 741 to 74n.

The first sensing driving circuit 710 receives a sensor control signal SSCS1, and outputs fingerprint sensing signals FS1a to FSna and FS1b to FSnb. The fingerprint sensing signals FS1a to FSna and FS1b to FSnb may include first fingerprint sensing signals FS1a to FSna and second fingerprint sensing signals FS1b to FSnb.

The second sensing driving circuit 720 receives the sensor control signal SSCS1, and outputs touch sensing signals TS1a to TSna and TS1b to TSnb. The touch sensing signals TS1a to TSna and TS1b to TSnb may include first touch sensing signals TS1a to TSna and second touch sensing signals TS1b to TSnb.

The clock selector 730 receives the sensor control signal SSCS1, and outputs a clock signal CLK.

Each of the first to n-th buffers 741 to 74n receives two corresponding fingerprint sensing signals from among the fingerprint sensing signals FS1a to FSna and FS1b to FSnb, two corresponding touch sensing signals from among the touch sensing signals TS1a to TSna and TS1b to TSnb, and the clock signal CLK. The first to n-th buffers 741 to 74n output the sensor scan signals S1 to Sn, respectively.

Figure 15:
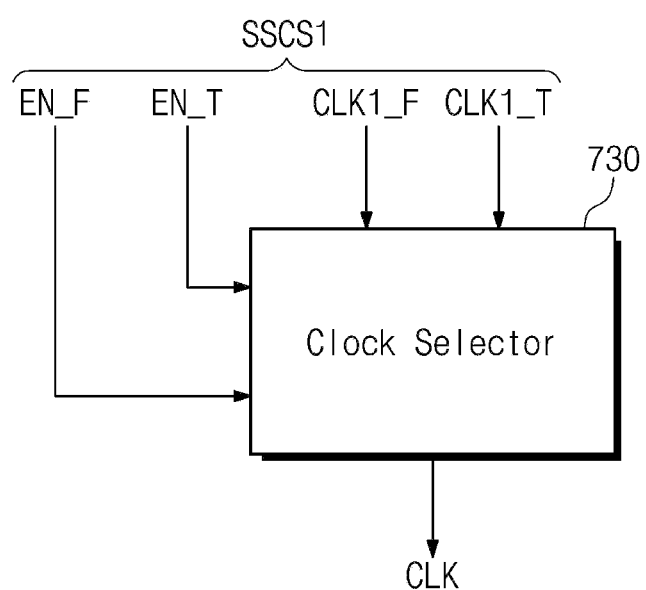
FIG. 15 is a block diagram illustrating a clock selector, according to an embodiment of the present disclosure.

FIG. 15 is a block diagram illustrating the clock selector 730, according to an embodiment.

Referring to FIG. 15, the clock selector 730 receives the sensor control signal SSCS1 from the driving controller 100 shown in FIG. 3. The sensor control signal SSCS1 includes a fingerprint enable signal EN_F, a touch enable signal EN_T, a first fingerprint clock signal CLK1_F, and a first touch clock signal CLK1_T.

In response to the fingerprint enable signal EN_F and the touch enable signal EN_T, the clock selector 730 outputs one of the first fingerprint clock signal CLK1_F or the first touch clock signal CLK1_T as the clock signal CLK. In an embodiment, when the fingerprint enable signal EN_F is an active level and the touch enable signal EN_T is at an inactive level, the clock selector 730 outputs the first fingerprint clock signal CLK1_F as the clock signal CLK. In an embodiment, when the fingerprint enable signal EN_F is at an inactive level and the touch enable signal EN_T is at an active level, the clock selector 730 outputs the first touch clock signal CLK1_T as the clock signal CLK.

Figure 16:
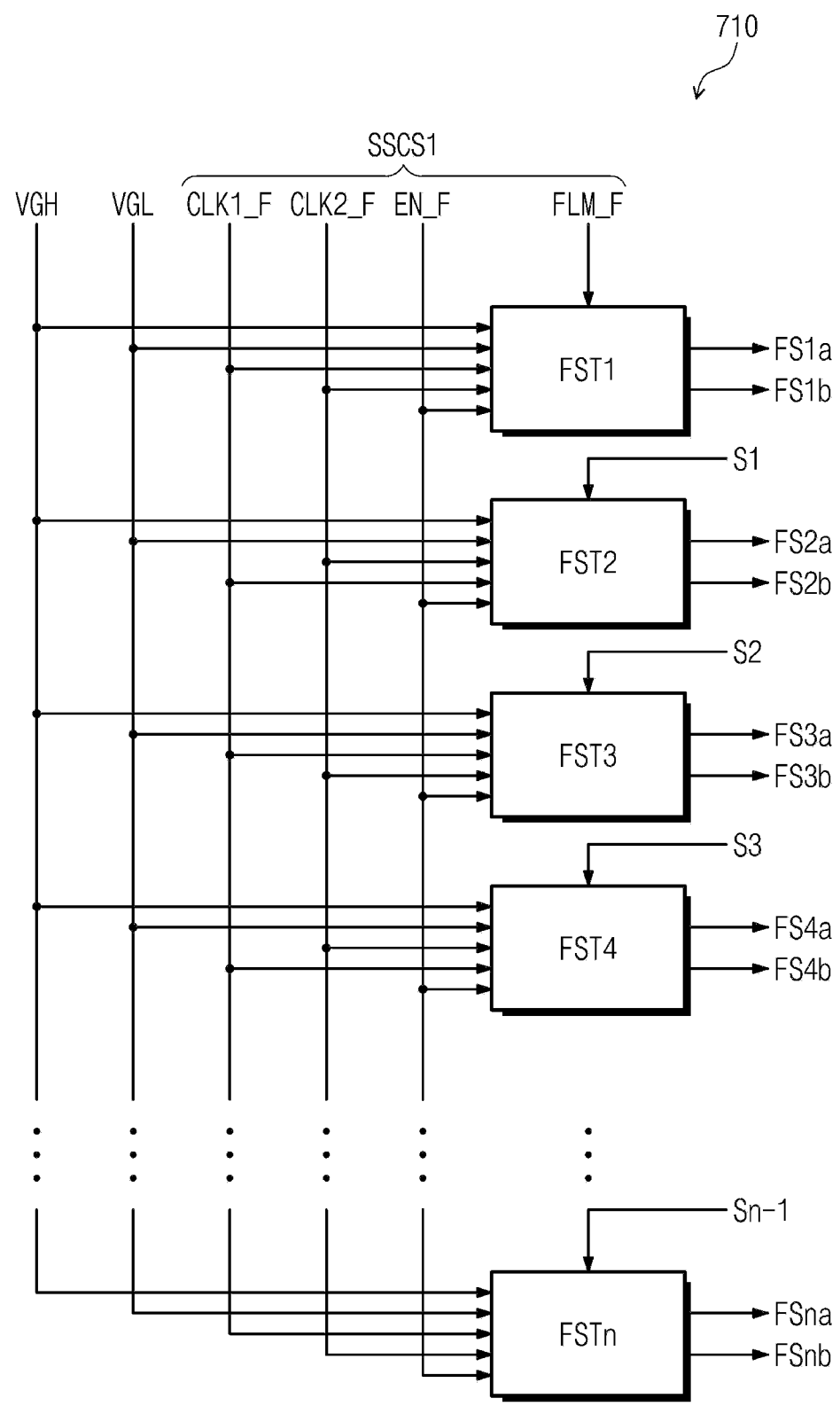
FIG. 16 is a block diagram showing a first sensing driving circuit shown in FIG. 14.

FIG. 16 is a block diagram showing the first sensing driving circuit 710 shown in FIG. 14.

Referring to FIG. 16, the first sensing driving circuit 710 includes driving stages FST1 to FSTn.

Each of the driving stages FST1 to FSTn may receive the sensor control signal SSCS1 from the driving controller 100 shown in FIG. 3. The sensor control signal SSCS1 includes the first fingerprint clock signal CLK1_F, a second fingerprint clock signal CLK2_F, the fingerprint enable signal EN_F, and a fingerprint start signal FLM_F. Each of the driving stages FST1 to FSTn receives the first voltage VGH and the second voltage VGL. The first voltage VGH and the second voltage VGL may be provided from the voltage generator 600 illustrated in FIG. 3.

In an embodiment, the driving stages FST1 to FSTn output fingerprint sensing signals FS1a to FSna and FS1b to FSnb. For example, the driving stage FST1 may output the fingerprint sensing signals FS1a and FS1b, the driving stage FST2 may output the fingerprint sensing signals FS2a and FS2b, and the driving stage FSTn may output the fingerprint sensing signals FSna and FSnb. The fingerprint sensing signals FS1a to FSna and FS1b to FSnb may be provided to the first to n-th buffers 741 to 74n shown in FIG. 14.

The first driving stage FST1 may receive the fingerprint start signal FLM_F as an input signal. Each of the remaining driving stages FST2 to FSTn may receive one of the sensor scan signals S1 to Sn−1 output from the first to (n−1)-th buffers 741 to 74n−1 as an input signal. For example, the driving stage FST2 may receive the sensor scan signal S1 as an input signal, the driving stage FST3 may receive the sensor scan signal S2 as an input signal, and the driving stage FSTn may receive the sensor scan signal Sn−1 as an input signal.

Figure 17:
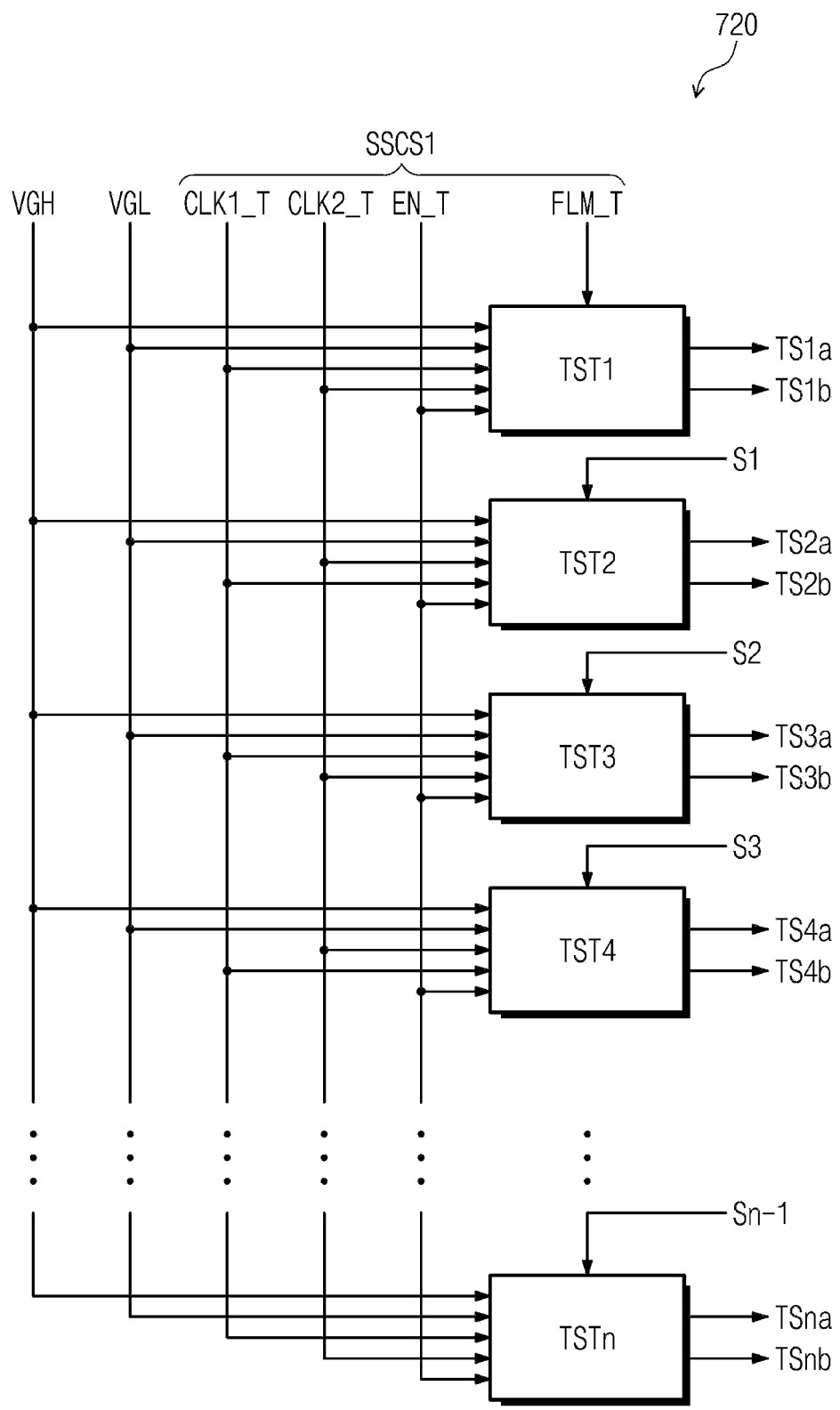
FIG. 17 is a block diagram showing a second sensing driving circuit shown in FIG. 14.

FIG. 17 is a block diagram showing the second sensing driving circuit 720 shown in FIG. 14.

Referring to FIG. 17, the second sensing driving circuit 720 includes driving stages TST1 to TSTn.

Each of the driving stages TST1 to TSTn may receive the sensor control signal SSCS1 from the driving controller 100 shown in FIG. 3. The sensor control signal SSCS1 includes the first touch clock signal CLK1_T, a second touch clock signal CLK2_T, the touch enable signal EN_T, and a touch start signal FLM_T. Each of the driving stages TST1 to TSTn receives the first voltage VGH and the second voltage VGL. The first voltage VGH and the second voltage VGL may be provided from the voltage generator 600 illustrated in FIG. 3.

In an embodiment, the driving stages TST1 to TSTn output the touch sensing signals TS1a to TSna and TS1b to TSnb. For example, the driving stage TST1 may output the touch sensing signals TS1a and TS1b, the driving stage TST2 may output the touch sensing signals TS2a and TS2b, and the driving stage TSTn may output the touch sensing signals TSna and TSnb. The touch sensing signals TS1a to TSna and TS1b to TSnb may be provided to the first to n-th buffers 741 to 74n shown in FIG. 14.

The first driving stage TST1 may receive the touch start signal FLM_T as an input signal. Each of the remaining driving stages TST2 to TSTn may receive one of the sensor scan signals S1 to Sn−1 output from first to (n−1)-th buffers 741 to 74n−1, which are illustrated in FIG. 14, as an input signal. For example, the driving stage TST2 may receive the sensor scan signal S1 as an input signal, the driving stage TST3 may receive the sensor scan signal S2 as an input signal, and the driving stage TSTn may receive the sensor scan signal Sn−1 as an input signal.

Figure 18:
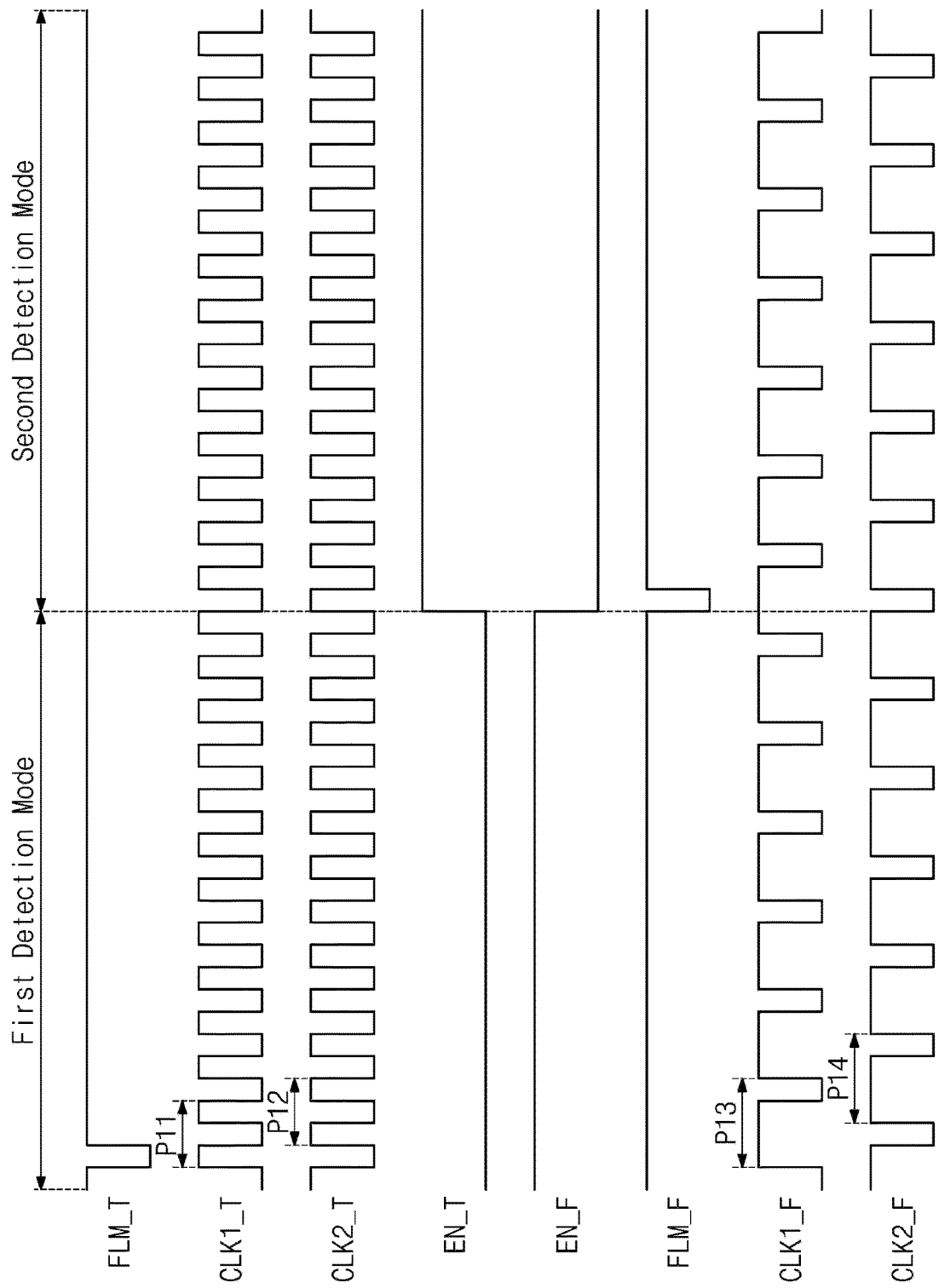
FIG. 18 is a timing diagram of signals provided to a first sensing driving circuit shown in FIG. 16 and a second sensing driving circuit shown in FIG. 17.

FIG. 18 is a timing diagram of signals provided to the first sensing driving circuit 710 shown in FIG. 16 and the second sensing driving circuit 720 shown in FIG. 17.

A first detection mode may be a touch detection mode in which the sensors FX shown in FIG. 3 detect a user's touch input. In the first detection mode, the first touch clock signal CLK1_T and the second touch clock signal CLK2_T may have the same or substantially the same frequency as each other and different phases from each other. In other words, a period P11 of the first touch clock signal CLK1_T is the same or substantially the same as a period P12 of the second touch clock signal CLK2_T (e.g., P11=P12). In an embodiment, the first touch clock signal CLK1_T and the second touch clock signal CLK2_T may be complementary signals.

In the first detection mode (e.g., a touch detection mode), the touch enable signal EN_T may be at a low level, which is an active level, and the fingerprint enable signal EN_F may be at a high level, which is an inactive level.

In the first detection mode in which the touch enable signal EN_T is at a low level and the fingerprint enable signal EN_F is at a high level, the second sensing driving circuit 720 shown in FIG. 17 may operate in response to the touch start signal FLM_T.

A second detection mode may be a fingerprint detection mode in which the sensors FX shown in FIG. 3 detect a user's fingerprint. In the second detection mode, the first fingerprint clock signal CLK1_F and the second fingerprint clock signal CLK2_F may have the same or substantially the same frequency as each other and different phases from each other. In other words, a period P13 of the first fingerprint clock signal CLK1_F is the same or substantially the same as a period P14 of the second fingerprint clock signal CLK2_F (e.g., P13=P14).

In the second detection mode (e.g., a fingerprint detection mode), the touch enable signal EN_T may be at a high level, which is an inactive level, and the fingerprint enable signal EN_F may be at a low level, which is an active level.

In the second detection mode in which the touch enable signal EN_T is at a high level and the fingerprint enable signal EN_F is at a low level, the first sensing driving circuit 710 shown in FIG. 16 may operate in response to the fingerprint start signal FLM_F.

Figure 19:
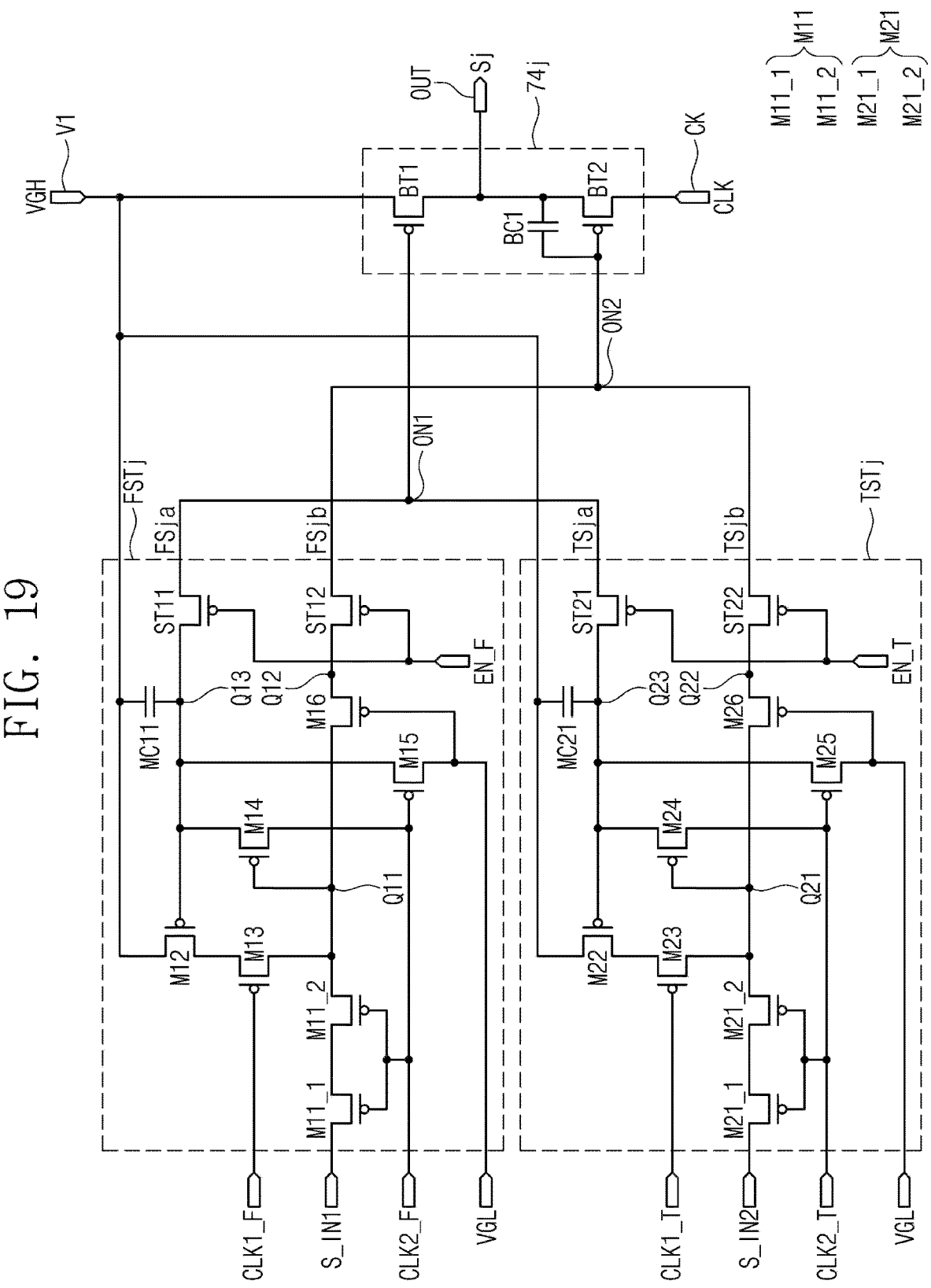
FIG. 19 illustrates a circuit diagram showing a j-th driving stage in a first sensing driving circuit, a j-th driving stage in a second sensing driving circuit, and a j-th buffer, according to an embodiment of the present disclosure.

FIG. 19 illustrates a circuit diagram showing a j-th driving stage FSTj in the first sensing driving circuit 710, a j-th driving stage TSTj in the second sensing driving circuit 720, and a j-th buffer 74j, according to an embodiment of the present disclosure.

FIG. 19 shows the j-th driving stage FSTj (where j is a positive integer) from among the driving stages FST1 to FSTn shown in FIG. 16, the j-th driving stage TSTj from among the driving stages TST1 to TSTn shown in FIG. 17, and the j-th buffer 74j from among the first to n-th buffers 741 to 74n shown in FIG. 14.

Each of the driving stages FST1 to FSTn shown in FIG. 16 may include the same or substantially the same circuit configuration as that of the j-th driving stage FSTj shown in FIG. 19. Hereinafter, the j-th driving stage FSTj is referred to as the "driving stage FSTj".

Each of the driving stages TST1 to TSTn shown in FIG. 17 may include the same or substantially the same circuit configuration as that of the j-th driving stage TSTj shown in FIG. 19. Hereinafter, the j-th driving stage TSTj is referred to as the "driving stage TSTj".

Each of the first to n-th buffers 741 to 74*n* shown in FIG. 14 may include the same or substantially the same circuit configuration as that of the j-th buffer 74*j* shown in FIG. 19.

Referring to FIG. 19, the driving stage FSTj may include a first driving circuit, a first switching transistor ST11, and a second switching transistor ST12. The first driving circuit may include the first to sixth transistors M11, M12, M13, M14, M15, and M16, and a first capacitor MC11.

The first to sixth transistors M11, M12, M13, M14, M15, and M16 and the first capacitor MC11 in the driving stage FSTj shown in FIG. 19 are similar to the first to sixth transistors M1, M2, M3, M4, M5, and M6 and the first capacitor MC1 of the driving stage SGj shown in FIG. 11, and thus, redundant description thereof may not be repeated.

The driving stage FSTj may determine signal levels of first to third nodes Q11, Q12, and Q13 in response to the first fingerprint clock signal CLK1_F, the second fingerprint clock signal CLK2_F, the fingerprint enable signal EN_F, and an input signal S_IN1. The driving stage FSTj may output a fingerprint sensing signal FSja to a first output node ON1, and may output a fingerprint sensing signal FSjb to a second output node ON2. As described above with reference to FIG. 16, the input signal S_IN1 may be either the fingerprint start signal FLM_F or one of the sensor scan signals S1 to Sn−1.

The first switching transistor ST11 is connected between the third node Q13 (e.g., a first internal node) and the first output node ON1, and includes a gate electrode for receiving the fingerprint enable signal EN_F. The first switching transistor ST11 may deliver a signal of the third node Q13 to the first output node ON1 in response to the fingerprint enable signal EN_F. The signal of the first output node ON1 is the fingerprint sensing signal FSja.

The second switching transistor ST12 is connected between the second node Q12 (e.g., a second internal node) and the second output node ON2, and includes a gate electrode for receiving the fingerprint enable signal EN_F. The second switching transistor ST12 may deliver a signal of the second node Q12 to the second output node ON2 in response to the fingerprint enable signal EN_F. The signal of the second output node ON2 is the fingerprint sensing signal FSjb.

The driving stage TSTj may include a second driving circuit, a first switching transistor ST21, and a second switching transistor ST22. The second driving circuit may include first to sixth transistors M21, M22, M23, M24, M25, and M26, and a first capacitor MC21.

The first to sixth transistors M21, M22, M23, M24, M25, and M26 and the first capacitor MC21 in the driving stage TSTj shown in FIG. 19 are similar to the first to sixth transistors M1, M2, M3, M4, M5, and M6 and the first capacitor MC1 of the driving stage SGj shown in FIG. 11, and thus, redundant description thereof may not be repeated.

The driving stage TSTj may determine signal levels of first to third nodes Q21, Q22, and Q23 in response to the first touch clock signal CLK1_T, the second touch clock signal CLK2_T, the touch enable signal EN_T, and an input signal S_IN2. Furthermore, the driving stage TSTj may output a touch sensing signal TSja to the first output node ON1, and may output the touch sensing signal TSjb to the second output node ON2. As described above with reference to FIG. 16, the input signal S_IN2 may be either the touch start signal FLM_T or one of the sensor scan signals S1 to Sn−1.

The first switching transistor ST21 is connected between the third node Q23 and the first output node ON1, and includes a gate electrode for receiving the touch enable signal EN_T. The first switching transistor ST21 may deliver a signal of the third node Q23 to the first output node ON1 in response to the touch enable signal EN_T. The signal of the first output node ON1 is the touch sensing signal TSja.

The second switching transistor ST22 is connected between the second node Q22 and the second output node ON2, and includes a gate electrode for receiving the touch enable signal EN_T. The second switching transistor ST22 may deliver a signal of the second node Q22 to the second output node ON2 in response to the touch enable signal EN_T. The signal of the second output node ON2 is the touch sensing signal TSjb.

The j-th buffer 74*j* includes a first buffer transistor BT1, a second buffer transistor BT2, and a capacitor BC1. The first buffer transistor BT1 is connected between the first voltage input terminal V1 and the output terminal OUT, and includes a gate electrode connected to the first output node ON1. The second buffer transistor BT2 is connected between the output terminal OUT and a clock input terminal CK, and includes a gate electrode connected to the first output node ON2. The clock input terminal CK receives the clock signal CLK output from the clock selector 730 shown in FIG. 15.

In an embodiment, the clock signal CLK may be the same as one of the first fingerprint clock signal CLK1_F or the first touch clock signal CLK1_T. In an embodiment, the clock signal CLK may be different from the first fingerprint clock signal CLK1_F and the first touch clock signal CLK1_T. At this time, the frequency and timing of the clock signal CLK may be changed depending on an operating mode and an operating frequency.

The first buffer transistor BT1, the second buffer transistor BT2, and the capacitor BC1 in the j-th buffer 74*j* correspond to the seventh transistor M7, the eighth transistor M8, and the capacitor MC2 in the driving stage SGj shown in FIG. 11. Each of the driving stages SG1 to SGn shown in FIG. 10 may include the seventh transistor M7, the eighth transistor M8, and the capacitor MC2.

Referring to FIGS. 18 and 19, when in the first detection mode (e.g., a touch detection mode), the touch enable signal EN_T is at a low level and the fingerprint enable signal EN_F is at a high level, and thus, the first and second switching transistors ST11 and ST12 in the driving stage FSTj are turned off, and the first and second switching transistors ST21 and ST22 in the driving stage TSTj are turned on.

In the first detection mode, the j-th buffer 74*j* may receive the touch sensing signals TSja and TSjb output from the driving stage TSTj, and may output the sensor scan signal Sj. The sensor scan signal Sj may have the same first operating frequency as that of the first touch clock signal CLK1_T and the second touch clock signal CLK2_T.

When in the second detection mode (e.g., a fingerprint detection mode), the touch enable signal EN_T is at a high level and the fingerprint enable signal EN_F is at a low level, and thus, the first and second switching transistors ST11 and ST12 in the driving stage FSTj are turned on, and the first and second switching transistors ST21 and ST22 in the driving stage TSTj are turned off.

In the second detection mode, the j-th buffer 74*j* may receive the fingerprint sensing signals FSja and FSjb output from the driving stage FSTj, and may output the sensor scan signal Sj. The sensor scan signal Sj may have the same first operating frequency as that of the first fingerprint clock signal CLK1_F and the second fingerprint clock signal CLK2_F.

As shown in FIGS. 16, 17, and 19, the driving stages FST1 to FSTn in the first sensing driving circuit 710 and the driving stages TST1 to TSTn in the second sensing driving circuit 720 do not include a configuration corresponding to the seventh transistor M7, the eighth transistor M8, and the capacitor MC2 shown in FIG. 11. Instead, the first sensing driving circuit 710 and the second sensing driving circuit 720 share the first to n-th buffers 741 to 74n.

To maintain signal levels of the sensor scan signals S1 to Sn in a stable state, the first buffer transistor BT1 and the second buffer transistor BT2 in each of the first to n-th buffers 741 to 74n are larger in size than the other transistors (e.g., the first to sixth transistors M11, M12, M13, M14, M15, and M16 or the first to sixth transistors M21, M22, M23, M24, M25, and M26).

The circuit area of the sensor driver 700-1 may be minimized or reduced by using the first buffer transistor BT1 and the second buffer transistor BT2 in common without having the first buffer transistor BT1 and the second buffer transistor BT2 in the driving stages FST1 to FSTn in each of the driving stages TST1 to TSTn.

Figure 20:
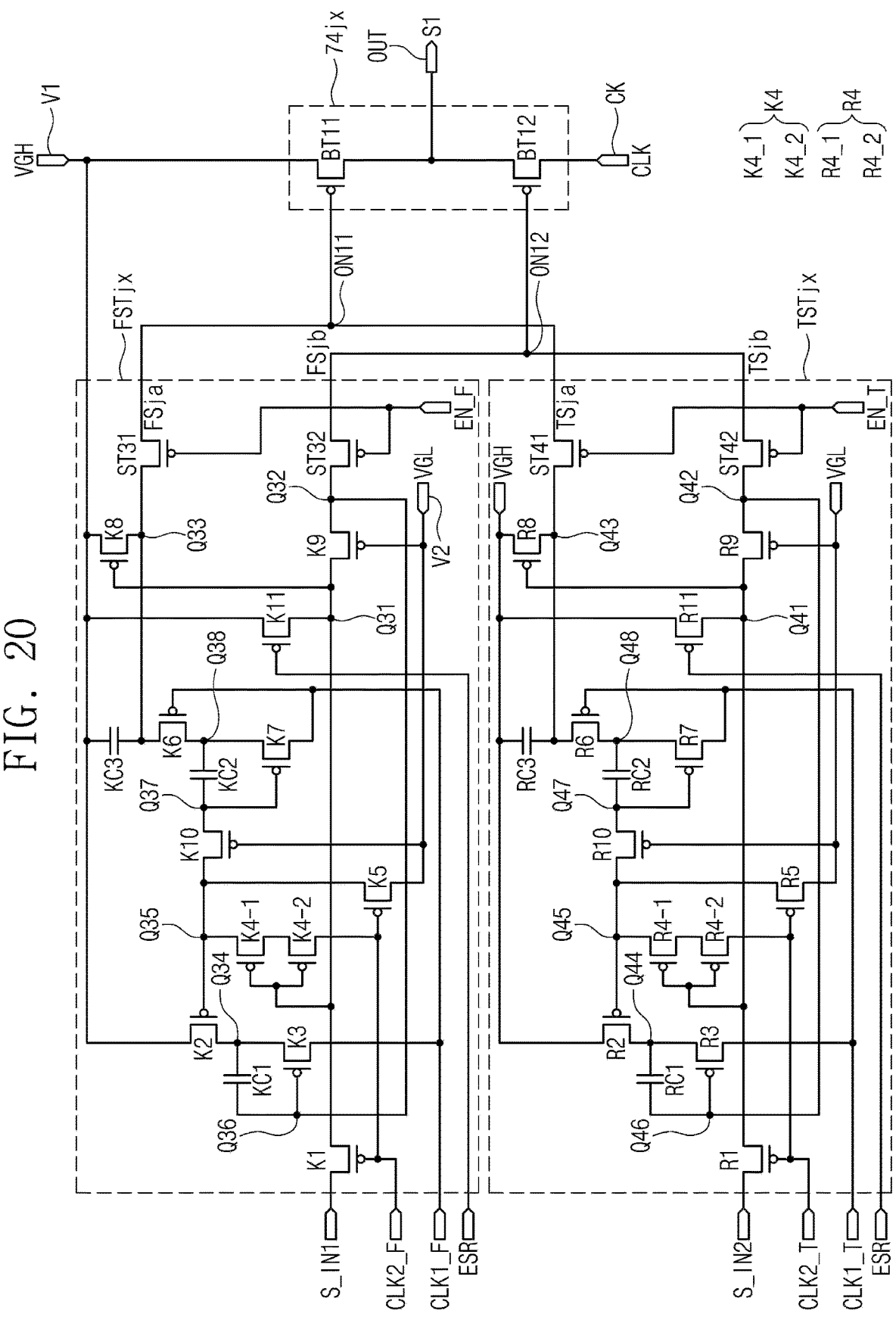
FIG. 20 shows a circuit diagram showing a j-th driving stage in a first sensing driving circuit, a j-th driving stage in a second sensing driving circuit, and a j-th buffer, according to an embodiment of the present disclosure.

FIG. 20 shows a circuit diagram showing a j-th driving stage FSTjx in the first sensing driving circuit 710, a j-th driving stage TSTjx in the second sensing driving circuit 720, and a j-th buffer 74jx, according to an embodiment of the present disclosure.

Each of the driving stages FST1 to FSTn shown in FIG. 16 may include the same or substantially the same circuit configuration as that of the j-th driving stage FSTjx shown in FIG. 20. Hereinafter, the j-th driving stage FSTjx is referred to as the "driving stage FSTjx".

Each of the driving stages TST1 to TSTn shown in FIG. 17 may include the same or substantially the same circuit configuration as that of the j-th driving stage TSTjx shown in FIG. 20. Hereinafter, the j-th driving stage TSTjx is referred to as the "driving stage TSTjx".

Each of the first to n-th buffers 741 to 74n shown in FIG. 14 may include the same or substantially the same circuit configuration as the j-th buffer 74jx shown in FIG. 20.

Referring to FIG. 20, the driving stage FSTjx may include first to eleventh transistors K1 to K11, first to third capacitors KC1, KC2, and KC3, a first switching transistor ST31, and a second switching transistor ST32.

The first transistor K1 is connected between an input terminal for receiving the input signal S_IN1 and a first node Q31, and includes a gate electrode for receiving the second fingerprint clock signal CLK2_F.

The second transistor K2 is connected between a first voltage input terminal V1 for receiving the first driving voltage VGH and a fourth node Q34, and includes a gate electrode connected to a fifth node Q35.

The third transistor K3 is connected between the fourth node Q34 and an input terminal for receiving the first fingerprint clock signal CLK1_F, and includes a gate electrode connected to a sixth node Q36.

The fourth transistor K4 includes transistors K4-1 and K4-2. The transistors K4-1 and K4-2 may be sequentially connected in series between the fifth node Q35 and an input terminal for receiving the second fingerprint clock signal CLK2_F. The gate electrodes of the transistors K4-1 and K4-2 are connected to the first node Q31.

The fifth transistor K5 is connected between the fifth node Q35 and a second voltage input terminal V2 for receiving the second driving voltage VGL, and includes a gate electrode connected to the input terminal for receiving the second fingerprint clock signal CLK2_F.

The sixth transistor K6 is connected between a third node Q33 and an eighth node Q38, and includes a gate electrode connected to the input terminal for receiving the first fingerprint clock signal CLK1_F.

The seventh transistor K7 is connected between the eighth node Q38 and the input terminal for receiving the first fingerprint clock signal CLK1_F, and includes a gate electrode connected to a seventh node Q37.

The eighth transistor K8 is connected between the first voltage input terminal V1 and the third node Q33, and includes a gate electrode connected to the first node Q31.

The ninth transistor K9 is connected between the first node Q31 and the second node Q32, and includes a gate electrode connected to the second voltage input terminal V2.

The tenth transistor K10 is connected between the fifth node Q35 and the seventh node Q37, and includes a gate electrode connected to the second voltage input terminal V2.

The eleventh transistor K11 is connected between the first voltage input terminal V1 and the first node Q31, and includes a gate electrode connected to an input terminal for receiving a reset signal ESR. The eleventh transistor K11 is turned on when the reset signal ESR is at a low level, and the first node Q31 may be electrically connected to the first voltage input terminal V1. When the first node Q31 is at a high level, the fingerprint sensing signal FSjb is at a high level, and thus, the second buffer transistor BT12 may be turned off. Accordingly, the sensing scan signal Sj does not transition to an active level (e.g., a low level).

The first switching transistor ST31 is connected between the third node Q33 and a first output node ON11, and includes a gate electrode for receiving the fingerprint enable signal EN_F. The first switching transistor ST31 may deliver a signal of the third node Q33 to the first output node ON11 in response to the fingerprint enable signal EN_F. The signal of the first output node ON11 is the fingerprint sensing signal FSja.

The second switching transistor ST32 is connected between the second node Q32 and a second output node ON12, and includes a gate electrode for receiving the fingerprint enable signal EN_F. The second switching transistor ST32 may deliver a signal of the second node Q32 to the second output node ON12 in response to the fingerprint enable signal EN_F. The signal of the second output node ON12 is the fingerprint sensing signal FSjb.

The driving stage TSTjx may include first to eleventh transistors R1 to R11, first to third capacitors RC1, RC2, and RC3, a first switching transistor ST41, and a second switching transistor ST42.

The first to eleventh transistors R1 to R11 and the first to third capacitors RC1, RC2, and RC3 in the driving stage TSTjx are similar to the first to eleventh transistors K1 to K11 and the first to third capacitors KC1, KC2, and KC3 in the driving stage FSTjx, and thus, redundant description thereof may not be repeated.

The first switching transistor ST41 is connected between a third node Q43 and the first output node ON11, and includes a gate electrode for receiving the touch enable signal EN_T. The first switching transistor ST41 may deliver a signal of the third node Q43 to the first output node ON11 in response to the touch enable signal EN_T. The signal of the first output node ON11 is the touch sensing signal TSja.

The second switching transistor ST42 is connected between a second node Q42 and the second output node ON12, and includes a gate electrode for receiving the touch enable signal EN_T. The second switching transistor ST42 may deliver a signal of the second node Q42 to the second output node ON12 in response to the touch enable signal EN_T. The signal of the second output node ON12 is the touch sensing signal TSjb.

The j-th buffer 74*jx* includes a first buffer transistor BT11 and a second buffer transistor BT12. The first buffer transistor BT11 is connected between the first voltage input terminal V1 and the output terminal OUT, and includes a gate electrode connected to the first output node ON11. The second buffer transistor BT12 is connected between the output terminal OUT and the second voltage input terminal V2, and includes a gate electrode connected to the second output node ON12.

Referring to FIGS. 18 and 20, when in the first detection mode (e.g., a touch detection mode), the touch enable signal EN_T is at a low level and the fingerprint enable signal EN_F is at a high level, and thus, the first and second switching transistors ST31 and ST32 in the driving stage FSTjx are turned off, and the first and second switching transistors ST41 and ST42 in the driving stage TSTjx are turned on.

In the first detection mode, the j-th buffer 74*jx* may receive the touch sensing signals TSja and TSjb output from the driving stage TSTjx, and may output the sensor scan signal Sj. The sensor scan signal Sj may have the same or substantially the same first operating frequency as that of the first touch clock signal CLK1_T and the second touch clock signal CLK2_T.

When in the second detection mode (e.g., a fingerprint detection mode), the touch enable signal EN_T is at a high level and the fingerprint enable signal EN_F is at a low level, and thus, the first and second switching transistors ST31 and ST32 in the driving stage FSTjx are turned on, and the first and second switching transistors ST41 and ST42 in the driving stage TSTjx are turned off.

In the second detection mode, the j-th buffer 74*jx* may receive the fingerprint sensing signals FSja and FSjb output from the driving stage FSTjx, and may output the sensor scan signal Sj. The sensor scan signal Sj may have the same or substantially the same first operating frequency as that of the first fingerprint clock signal CLK1_F and the second fingerprint clock signal CLK2_F.

The circuit area of the sensor driver 700-1 may be minimized or reduced by using the first buffer transistor BT11 and the second buffer transistor BT12 in common without having the first buffer transistor BT1 and the second buffer transistor BT2 in the driving stages FST1 to FSTn in each of the driving stages TST1 to TSTn.

Circuit configurations of the driving stages FST1 to FSTn in the first sensing driving circuit 710 and the driving stages TST1 to TSTn in the second sensing driving circuit 720 are not limited to the examples shown in FIGS. 19 and 20, and may be variously modified as needed or desired.

Figure 21:
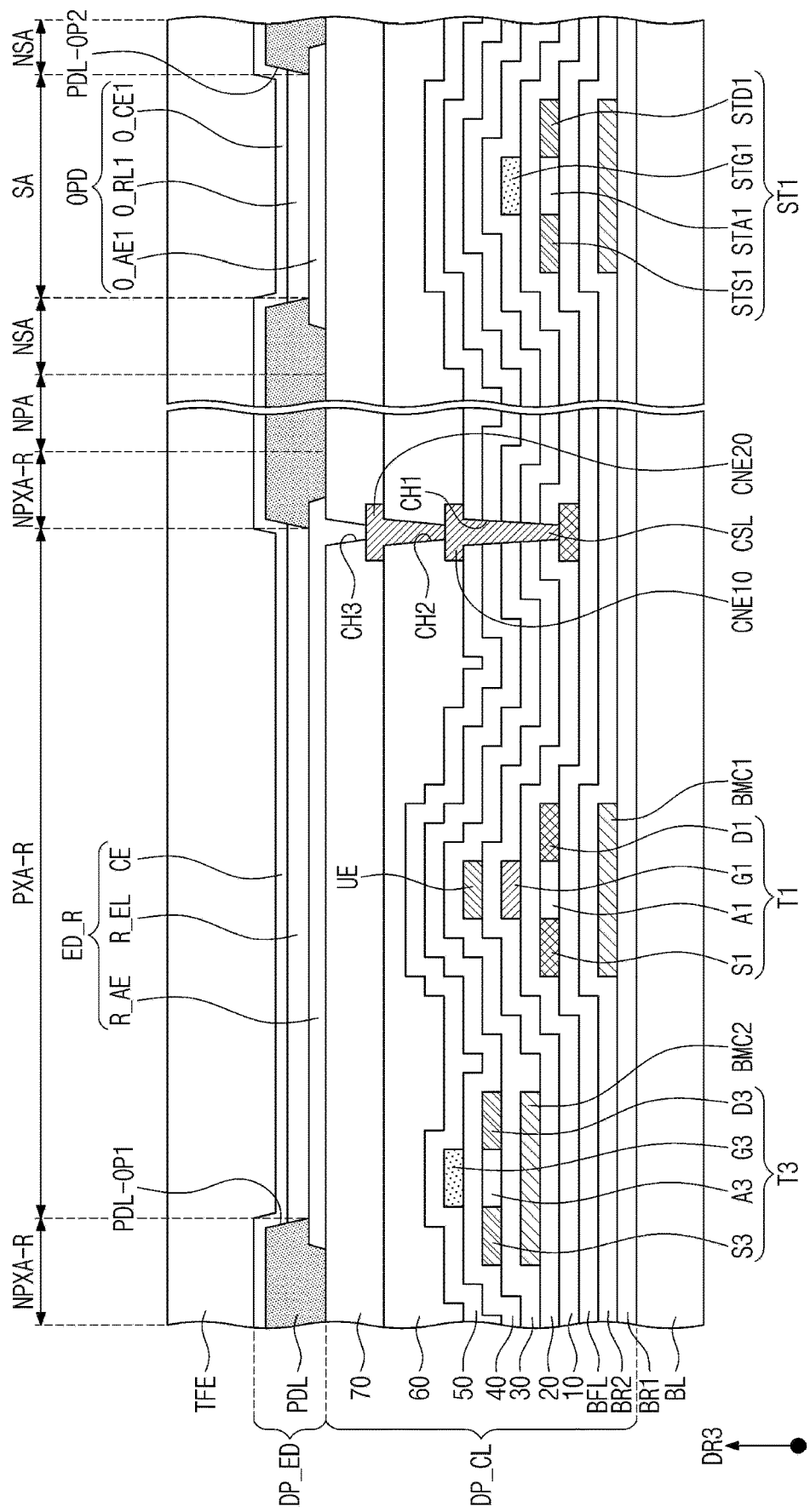
FIG. 21 is a cross-sectional view of a display panel, according to an embodiment of the present disclosure.

FIG. 21 is a cross-sectional view of the display panel DP, according to an embodiment of the present disclosure. FIG. 21 shows portions of first and third transistors T1 and T3 shown in FIG. 5 and portions of the reset transistor ST1 shown in FIG. 7.

Referring to FIGS. 2 and 21, the display panel DP may include the base layer BL, the circuit layer DP_CL disposed on the base layer BL, the element layer DP_ED, and the encapsulation layer TFE.

The base layer BL may include a synthetic resin layer. The synthetic resin layer may include a thermosetting resin. In more detail, the synthetic resin layer may be a polyimide-based resin layer, but the material thereof is not particularly limited thereto. The synthetic resin layer may include at least one of an acrylate-based resin, a methacrylate-based resin, polyisoprene, a vinyl-based resin, an epoxy-based resin, a urethane-based resin, a cellulose-based resin, a siloxane-based resin, a polyamide-based resin, or a perylene-based resin. In other embodiments, the base layer BL may include a glass substrate, a metal substrate, an organic/inorganic composite substrate, or the like.

At least one inorganic layer is formed on an upper surface of the base layer BL. The inorganic layer may include at least one of aluminum oxide, titanium oxide, silicon oxide, silicon oxynitride, zirconium oxide, or hafnium oxide. The inorganic layer may be formed of multiple layers. The multi-layered inorganic layers may constitute barrier layers BR1 and BR2 and/or a buffer layer BFL, which will be described in more detail below. The barrier layers BR1 and BR2 and the buffer layer BFL may be disposed selectively.

The barrier layers BR1 and BR2 prevent foreign objects from being introduced from the outside. The barrier layers BR1 and BR2 may include a silicon oxide layer and a silicon nitride layer. Each of the silicon oxide layer and the silicon nitride layer may include a plurality of layers, and the silicon oxide layers and the silicon nitride layers may be alternately stacked.

The barrier layers BR1 and BR2 may include the first barrier layer BR1 and the second barrier layer BR2. A first back metal layer BMC1 may be interposed between the first barrier layer BR1 and the second barrier layer BR2. In an embodiment of the present disclosure, the first back metal layer BMC1 may be omitted.

The buffer layer BFL may be disposed on the barrier layers BR1 and BR2. The buffer layer BFL improves a bonding force between the base layer BL and a semiconductor pattern and/or a conductive pattern. The buffer layer BFL may include a silicon oxide layer and a silicon nitride layer. The silicon oxide layer and the silicon nitride layer may be alternately stacked.

A first semiconductor pattern may be disposed on the buffer layer BFL. The first semiconductor pattern may include a silicon semiconductor. For example, the silicon semiconductor may include amorphous silicon or polycrystalline silicon. For example, the first semiconductor pattern may include low-temperature polysilicon.

FIG. 21 illustrates a portion of the first semiconductor pattern disposed on the buffer layer BFL. Another portion of the first semiconductor pattern may be further disposed in another area. The first semiconductor pattern may be arranged across the pixels in a suitable rule (e.g., a specific or predetermined rule). The first semiconductor pattern may have different electrical characteristics depending on whether or not the first semiconductor pattern is doped. The first semiconductor pattern may include a first area having high conductivity, and a second area having low conductivity. The first area may be doped with an N-type dopant or a P-type dopant. A P-type transistor may include an area doped with the P-type dopant, and an N-type transistor may include an area doped with the N-type dopant. The second area may be an undoped area or an area doped with a concentration lower than a concentration in the first area.

The conductivity of the first area is greater than the conductivity of the second area. The first area may serve or substantially serve as an electrode or a signal line. The second area may correspond to or substantially correspond to an active area (e.g., a channel) of a transistor. In other words, a part of the semiconductor pattern may be an active area of the transistor. Another part thereof may be a source or drain of the transistor. Another part thereof may be a connection electrode or a connection signal line.

A first electrode S1, a channel part A1, and a second electrode D1 of the first transistor T1 are formed from the first semiconductor pattern. The first electrode S1 and the second electrode D1 of the first transistor T1 extend in opposite directions from the channel part A1.

A portion of a connection signal line CSL formed from the first semiconductor pattern is illustrated in FIG. 20. The connection signal line CSL may be electrically connected to the second electrode of the sixth transistor T6 (e.g., see FIG. 5) on a plane (e.g., in a plan view).

A first insulating layer 10 may be disposed on the buffer layer BFL. The first insulating layer 10 may overlap with a plurality of pixels in common, and may cover the first semiconductor pattern. The first insulating layer 10 may be an inorganic layer and/or an organic layer, and may have a single layer or multi-layered structure. The first insulating layer 10 may include at least one of aluminum oxide, titanium oxide, silicon oxide, silicon nitride, silicon oxynitride, zirconium oxide, or hafnium oxide. In an embodiment, the first insulating layer 10 may be a single silicon oxide layer. An insulating layer of the circuit layer DP_CL, which is described in more detail below, as well as the first insulating layer 10 may be an inorganic layer and/or an organic layer, and may have a single layer structure or a multi-layered structure. The inorganic layer may include at least one of the above-described materials, but is not limited thereto.

A third electrode G1 of the first transistor T1 is disposed on the first insulating layer 10. The third electrode G1 may be a portion of a metal pattern. The third electrode G1 of the first transistor T1 overlaps with the channel part A1 of the first transistor T1. In a process of doping the first semiconductor pattern, the third electrode G1 of the first transistor T1 may function as a mask. The third electrode G1 may include, but is not limited to, titanium (Ti), silver (Ag), an alloy containing silver (Ag), molybdenum (Mo), an alloy containing molybdenum (Mo), aluminum (Al), an alloy containing aluminum (Al), an aluminum nitride (AlN), tungsten (W), a tungsten nitride (WN), copper (Cu), indium tin oxide (ITO), indium zinc oxide (IZO), or the like.

A second insulating layer 20 may be disposed on the first insulating layer 10, and may cover the third electrode G1 of the first transistor T1. The second insulating layer 20 may be an inorganic layer and/or an organic layer, and may have a single layer structure or a multi-layered structure. The second insulating layer 20 may include at least one of silicon oxide, silicon nitride, or silicon oxynitride. In an embodiment, the second insulating layer 20 may have a multi-layered structure including a silicon oxide layer and a silicon nitride layer.

An upper electrode UE and a second back metal layer BMC2 may be disposed on the second insulating layer 20. The upper electrode UE may overlap with the third electrode G1. The upper electrode UE may be a portion of a metal pattern. A portion of the third electrode G1 and the upper electrode UE overlapping with the portion of the third electrode G1 may define the capacitor Cst (e.g., see FIG. 5). In an embodiment of the present disclosure, the second insulating layer 20 may be replaced with an insulating pattern. In this case, the upper electrode UE may be disposed on the insulating pattern, and the upper electrode UE may serve as a mask for forming an insulating pattern from the second insulating layer 20.

The second back metal layer BMC2 may be disposed to correspond to a lower portion of an oxide thin film transistor (e.g., the third transistor T3). The second back metal layer BMC2 may receive a constant or substantially constant voltage or a signal.

A third insulating layer 30 may be disposed on the second insulating layer 20, and may cover the upper electrode UE and the second back metal layer BMC2. The third insulating layer 30 may have a single layer or multi-layered structure. For example, the third insulating layer 30 may have a multi-layered structure including a silicon oxide layer and a silicon nitride layer.

A second semiconductor pattern may be disposed on the third insulating layer 30. The second semiconductor pattern may include an oxide semiconductor. The oxide semiconductor may include a plurality of areas that are distinguished from one another depending on whether or not a metal oxide is reduced. An area (hereinafter referred to as a "reduction area") in which the metal oxide is reduced has a higher conductivity than that of an area (hereinafter referred to as a "non-reduction area") in which the metal oxide is not reduced. The reduction area serves or substantially serves as a source area/drain area of the transistor or a signal line. The non-reduction area corresponds to an active area (e.g., a semiconductor area or a channel) of a transistor. In other words, a part of the second semiconductor pattern may be the active area of a transistor, another part thereof may be the source/drain area of the transistor, and the other part thereof may be a signal transmission area.

A first electrode S3, a channel part A3, and a second electrode D3 of the third transistor T3 are formed from the second semiconductor pattern. The first electrode S3 and the second electrode D3 include a metal reduced from a metal oxide semiconductor. The first electrode S3 and the second electrode D3 may extend in directions opposite to each other from the channel part A3 on a cross section (e.g., in a cross-sectional view).

A fourth insulating layer 40 may be disposed on the third insulating layer 30. The fourth insulating layer 40 may overlap with a plurality of pixels in common, and may cover the second semiconductor pattern. The fourth insulating layer 40 may include at least one of aluminum oxide, titanium oxide, silicon oxide, silicon nitride, silicon oxynitride, zirconium oxide, or hafnium oxide.

A third electrode G3 of the third transistor T3 is disposed on the fourth insulating layer 40. The third electrode G3 may be a portion of a metal pattern. The third electrode G3 of the third transistor T3 overlaps with the channel part A3 of the third transistor T3. The third electrode G3 may function as a mask in a process of doping the second semiconductor pattern. In an embodiment of the present disclosure, the fourth insulating layer 40 may be replaced with an insulating pattern.

A fifth insulating layer 50 may be disposed on the fourth insulating layer 40, and may cover the third electrode G3. The fifth insulating layer 50 may be an inorganic layer.

A first connection electrode CNE10 may be disposed on the fifth insulating layer 50. The first connection electrode CNE10 may be connected to the connection signal line CSL through a first contact hole CH1 penetrating the first to fifth insulating layers 10, 20, 30, 40, and 50.

A sixth insulating layer 60 may be disposed on the fifth insulating layer 50. The sixth insulating layer 60 may be an organic layer. The organic layer may include one or more general purpose polymers, such as benzocyclobutene (BCB), polyimide, hexamethyldisiloxane (HMDSO), polymethylmethacrylate (PMMA), or polystyrene (PS), a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, and/or a suitable blend thereof, but is not particularly limited thereto.

A second connection electrode CNE20 may be disposed on the fifth insulating layer 60. The second connection electrode CNE20 may be connected to the first connection electrode CNE10 through a second contact hole CH2 penetrating the sixth insulating layer 60. A seventh insulating layer 70 may be disposed on the sixth insulating layer 60, and may cover the second connection electrode CNE20. The seventh insulating layer 70 may be an organic layer.

A first electrode layer is disposed on the circuit layer DP_CL. A pixel defining layer PDL is formed on the first electrode layer. The first electrode layer may include red, green, and blue anodes, and the first anode O_AE1. FIG. 21 illustrates that the first electrode layer includes the red anode R_AE and the first anode O_AE1. The red, green, and blue anodes, and the first anode O_AE1 are disposed on the seventh insulating layer 70. The red anode R_AE may be connected to the second connection electrode CNE20 through a third contact hole CH3 penetrating the seventh insulating layer 70.

First and second film openings PDL-OP1 and PDL-OP2 are provided in the pixel defining layer PDL. The first film opening PDL-OP1 exposes at least part of the red anode R_AE. The second film opening PDL-OP2 exposes at least part of the first anode O_AE1.

In an embodiment of the present disclosure, the pixel defining layer PDL may further include a black material. The pixel defining layer PDL may further include a black organic dye/pigment, such as carbon black, aniline black, or the like. The pixel defining layer PDL may be formed by mixing a blue organic material and a black organic material with each other. The pixel defining layer PDL may further include a liquid-repellent organic material.

As shown in FIG. 21, the display panel DP may include a second emission area PXA-R, and a non-emission area NPXA-R adjacent to the second emission area PXA-R. The display panel DP may further include a green emission area and a blue emission area respectively overlapping with a green anode and a blue anode. The non-emission area NPXA-R may surround (e.g., around a periphery of) the second emission area PXA-R. In an embodiment, the second emission area PXA-R is defined to correspond to a partial area of the red anode R_AE exposed by the first film opening PDL-OP1.

A light emitting layer may be disposed on the first electrode layer. The light emitting layer may include red, green, and blue light emitting layers. The red, green, and blue light emitting layers may be disposed in areas corresponding to the first film openings PDL-OP1. The red, green, and blue light emitting layers may be separately formed in the red, green, and blue pixels PXR, PXG, and PXB illustrated in FIG. 4A. The red, green, and blue light emitting layers may be separately formed in the red, green, and blue pixels PXR, PXG1, PXG2, and PXB illustrated in FIG. 4B. Each of the red, green, and blue light emitting layers may include an organic material and/or an inorganic material. The red, green, and blue light emitting layers may generate a suitably colored light (e.g., a predetermined colored light). For example, the red light emitting layer R_EL may generate red light, the green light emitting layers may generate green light, and the blue light emitting layer may generate blue light. FIG. 21 shows that the red light emitting layer R_EL is disposed in an area corresponding to the first film opening PDL-OP1.

Above, patterned red, green, and blue light emitting layers are described. However, one light emitting layer may be commonly disposed in a plurality of emission areas. In this case, the light emitting layer may generate white light or blue light. Also, the light emitting layer may have a multi-layered structure that is referred to as "tandem".

Each of the red, green, and blue light emitting layers may include a low-molecular organic material or a high-molecular organic material as a light emitting material. As another example, each of the red, green, and blue light emitting layers may include a quantum dot material as a light emitting material. The core of a quantum dot may be selected from among a group II-VI compound, a group III-V compound, a group IV-VI compound, a group IV element, a group IV compound, and a combination thereof.

A cathode CE is disposed on the red, green, and blue light emitting layers. As an example, the cathode CE may be commonly disposed in the emission areas PXA-R, the non-emission area NPXA-R, and a non-pixel area NPA.

The circuit layer DP_CL may further include the sensor driving circuit SDC (e.g., see FIG. 7). For convenience of illustration, the reset transistor ST1 of the sensor driving circuit SDC is shown. A first electrode STS1, a channel part STA1, and a second electrode STD1 of the reset transistor ST1 are formed from the first semiconductor pattern. The fourth insulating layer 40 is disposed to cover the first electrode STS1, the channel part STA1, and the second electrode STD1 of the reset transistor ST1. A third electrode STG1 of the reset transistor ST1 is disposed on the first insulating layer 10. In an embodiment, the third electrode STG1 may be a part of the metal pattern. The third electrode STG1 of the reset transistor ST1 overlaps with the channel part STA1 of the reset transistor ST1.

In an embodiment of the present disclosure, the reset transistor ST1 may be disposed at (e.g., in or on) the same layer as that of the first transistor T1. In other words, the first electrode STS1, the channel part STA1, and the second electrode STD1 of the reset transistor ST1 may be formed through a process that is the same as that of the first electrode S1, the channel part A1, and the second electrode D1 of the first transistor T1. The third electrode STG1 of the reset transistor ST1 may be concurrently (e.g., simultaneously or substantially simultaneously) formed through the same process as that of the third electrode G1 of the first transistor T1. The first electrode and the second electrode of each of the amplification transistor ST2 and the output transistor ST3 of the sensor driving circuit SDC may be formed through the same process as that of the first electrode S1 and the second electrode D1 of the first transistor T1. The reset transistor ST1 and the first transistor T1 may be formed at (e.g., in or on) the same layer as each other through the same process. Accordingly, because an additional process of forming the reset transistor ST1 is not used, process efficiency and costs may be reduced.

The element layer DP_ED may further include the light sensing element OPD (e.g., see FIG. 7). FIG. 21 shows the light sensing element OPD.

The light sensing element OPD may include the first anode O_AE1, the first photoelectric conversion layer O_RL1, and a first cathode O_CE1. The first anode O_AE1 may be disposed at (e.g., in or on) the same layer as that of the first electrode layer. In other words, the first anode O_AE1 may be disposed on the circuit layer DP_CL, and may be concurrently (e.g., simultaneously or substantially simultaneously) formed through the same process as that of the red anode R_AE.

The second film opening PDL-OP2 of the pixel defining layer PDL exposes at least part of the first anode O_AE1. The first photoelectric conversion layer O_RL1 is disposed on the first anode O_AE1 exposed by the second film opening PDL-OP2. The first photoelectric conversion layer O_RL1 may include an organic photo-sensing material. The first cathode O_CE1 may be disposed on the first photoelectric conversion layer O_RL1. The first cathode O_CE1 may be concurrently (e.g., simultaneously or substantially simultaneously) formed through the same process as that of the cathode CE. As an example, the first cathode O_CE1 may be integrated with the cathode CE.

Each of the first anode O_AE1 and the first cathode O_CE1 may receive an electrical signal. The first cathode O_CE1 may receive a signal different from that of the first anode O_AE1. Accordingly, an electric field (e.g., a predetermined electric field) may be formed between the first anode O_AE1 and the first cathode O_CE1. The first photoelectric conversion layer O_RL1 generates an electrical signal corresponding to the light incident on the sensor. The first photoelectric conversion layer O_RL1 may generate charges by absorbing the energy of the incident light. For example, the first photoelectric conversion layer O_RL1 may include a light-sensitive semiconductor material.

The charges generated by the first photoelectric conversion layer O_RL1 change an electric field between the first anode O_AE1 and the first cathode O_CE1. The amount of charges generated by the first photoelectric conversion layer O_RL1 may vary depending on whether or not light is incident onto the light sensing element OPD, the amount of light incident onto the light sensing element OPD, or the intensity of light incident onto the light sensing element OPD. Accordingly, the electric field formed between the first anode O_AE1 and the first cathode O_CE1 may be changed. The light sensing element OPD according to an embodiment of the present disclosure may obtain fingerprint information of a user or coordinate information by a touch input through a change in the electric field between the first anode O_AE1 and the first cathode O_CE1.

However, the present disclosure is not limited thereto. The light sensing element OPD may include a phototransistor that uses first photoelectric conversion layer O_RL1 as an active layer. In this case, the light sensing element OPD may obtain fingerprint information by sensing the amount of current flowing through the phototransistor. The light sensing element OPD according to an embodiment of the present disclosure may include various suitable photoelectric conversion elements capable of generating electrical signals in response to a change in the amount of light, but the present disclosure is not limited thereto.

The encapsulation layer TFE is disposed on the element layer DP_ED. The encapsulation layer TFE includes at least one inorganic layer and/or at least one organic layer. In an embodiment of the present disclosure, the encapsulation layer TFE may include two inorganic layers, and an organic layer disposed therebetween. In an embodiment of the present disclosure, a thin film encapsulation layer may include a plurality of inorganic layers and a plurality of organic layers, which are alternately stacked.

The encapsulation inorganic layer protects the red light emitting element ED_R and the light receiving element OPD from moisture/oxygen, and the encapsulation organic layer protects the red light emitting element ED_R and the light receiving element OPD from foreign substances. The encapsulation inorganic layer may include a silicon nitride layer, a silicon oxynitride layer, a silicon oxide layer, a titanium oxide layer, an aluminum oxide layer, or the like, but is not specifically limited thereto. The encapsulation organic layer may include an acryl-based organic layer, but is not specifically limited thereto.

While one or more embodiments of the present disclosure have been described for illustrative purposes, those skilled in the art will appreciate that various modifications, and substitutions are possible, without departing from the scope and spirit of the present disclosure. Accordingly, the spirit and scope of the present disclosure is not limited to the detailed description of the present specification, and should be defined by the claims and their equivalents.

A display device according to embodiments of the present disclosure includes sensors. The sensors may sense an external input (e.g., a user's touch), as well as biometric information, such as a fingerprint. Accordingly, the display device may not include a separate input sensing layer for sensing the external input. In this case, the thickness of the display device may be further reduced. As a result, flexibility may be improved, and thus, the display device may be implemented in various suitable kinds. For example, the display device may be implemented as a foldable, rollable, or slidable display device as described above.

In a touch detection mode, the sensors may operate at a first operating frequency. In a fingerprint detection mode, the sensors may operate at a second operating frequency different from the first operating frequency.

The display device according to one or more embodiments of the present disclosure may operate a sensor in the touch detection mode and the fingerprint detection mode by using one sensor driver. Accordingly, a circuit area of a sensor driver may be minimized or reduced.

According to one or more embodiments of the present disclosure, the display device may separately include a first sensor driver for operating a sensor in a touch detection mode and a second sensor driver for operating a sensor in a fingerprint detection mode, and may commonly use a buffer circuit for providing sensor driving signals output from the first sensor driver and second sensor driver to a sensor. As the buffer circuit is commonly used, the circuit area of the first sensor driver and the second sensor driver may be minimized or reduced.

The electronic or electric devices and/or any other relevant devices or components according to embodiments of the present disclosure described above may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:
   a pixel comprising a light emitting element;
   a sensor comprising a sensing element and a sensor driving circuit; and
   a sensor driver configured to output a sensor scan signal to a gate of a transistor in the sensor driving circuit to select the transistor to output a sensing signal to a readout line connected to the transistor,
   wherein the sensor driver comprises:
      a switching circuit connected between a first input terminal for receiving a first clock signal of a first operating frequency and a first clock node, and configured to output a first filtering clock signal of a second operating frequency to the first clock node in response to a first enable signal; and
      a driving circuit configured to output the sensor scan signal in response to the first filtering clock signal of the first clock node.

2. The display device of claim 1, wherein, when the first enable signal indicates a first detection mode, the second operating frequency of the first filtering clock signal is the same as the first operating frequency.

3. The display device of claim 2, wherein, when the first enable signal indicates a second detection mode, the second operating frequency of the first filtering clock signal is lower than the first operating frequency.

4. The display device of claim 3, wherein, in the second detection mode, a frequency of the first enable signal is the second operating frequency.

5. The display device of claim 4, wherein, when each of the first clock signal and the first enable signal is at a first level, the first filtering clock signal is at the first level.

6. The display device of claim 3, wherein the switching circuit comprises a first switching transistor connected between the first input terminal and the first clock node, and comprising a gate electrode connected to a second input terminal for receiving the first enable signal.

7. The display device of claim 6, wherein the switching circuit is connected between a third input terminal for receiving a second clock signal of the first operating frequency and a second clock node, and is configured to output a second filtering clock signal of the second operating frequency to the second clock node in response to a second enable signal, and wherein the driving circuit is configured to output the sensor scan signal in response to the first filtering clock signal of the first clock node and the second filtering clock signal of the second clock node.

8. The display device of claim 7, wherein the switching circuit further comprises a second switching transistor connected between the third input terminal and the second clock node, and comprising a gate electrode connected to a fourth input terminal for receiving the second enable signal.

9. The display device of claim 8, wherein the switching circuit further comprises a third switching transistor connected between a third clock node and the first input terminal, and comprising a gate electrode connected to the second input terminal, and wherein the driving circuit is configured to output the sensor scan signal in response to the first filtering clock signal of the first clock node, the second filtering clock signal of the second clock node, and a third filtering clock signal of the third clock node.

10. The display device of claim 7, wherein, in the first detection mode, frequencies of the first clock signal and the second clock signal are the same as each other, and phases of the first clock signal and the second clock signal are the same as each other, and wherein, in the second detection mode, the frequencies of the first clock signal and the second clock signal are the same as each other, and the phases of the first clock signal and the second clock signal are different from each other.

11. A display device comprising:
    a pixel comprising a light emitting element;
    a sensor comprising a plurality of sensing elements connected to a plurality of sensor scan lines, respectively;
    a driving controller configured to output a sensor control signal corresponding to a detection mode; and
    a sensor driver configured to operate in response to the sensor control signal, and comprising a plurality of driving stages, each of the driving stages being configured to provide a sensor scan signal to a corresponding sensor scan line from among the plurality of sensor scan lines to select a corresponding sensing element connected to the corresponding sensor scan line from among the plurality of sensing elements to output a sensing signal to a readout line connected to the corresponding sensing element,
    wherein each of the driving stages comprises:
       a switching circuit connected between a first input terminal for receiving a first clock signal of a first operating frequency and a first clock node, and configured to output a first filtering clock signal of a second operating frequency to the first clock node in response to a first enable signal; and
       a driving circuit configured to output the sensor scan signal in response to the first filtering clock signal of the first clock node.

12. The display device of claim 11, wherein, when the first enable signal indicates a first detection mode, the second operating frequency of the first filtering clock signal is the same as the first operating frequency, and wherein, when the first enable signal indicates a second detection mode, the second operating frequency of the first filtering clock signal is lower than the first operating frequency.

13. The display device of claim 12, wherein, in the second detection mode, a frequency of the first enable signal is the second operating frequency.

14. The display device of claim 11, wherein the switching circuit comprises a first switching transistor connected between the first input terminal and the first clock node, and comprising a gate electrode connected to a second input terminal for receiving the first enable signal.

15. A display device comprising:
a pixel comprising a light emitting element;
a sensor comprising a sensing element and a sensor driving circuit; and
a sensor driver configured to output a sensor scan signal to a gate of a transistor in the sensor driving circuit to select the transistor to output a sensing signal to a readout line connected to the transistor,
wherein the sensor driver comprises:
a buffer circuit electrically connected to a first output node and a second output node, and configured to output the sensor scan signal;
a first sensing driving circuit configured to output a first touch sensing signal and a second touch sensing signal to the first output node and the second output node, respectively, in a first detection mode; and
a second sensing driving circuit configured to output a first fingerprint sensing signal and a second fingerprint sensing signal to the first output node and the second output node, respectively, in a second detection mode.

16. The display device of claim 15, wherein the first sensing driving circuit comprises:
a first driving circuit configured to receive a first input signal and a fingerprint clock signal, and comprising a first internal node and a second internal node;
a first switch connected between the first internal node and the first output node, and configured to output a signal of the first internal node as the first fingerprint sensing signal in response to a fingerprint enable signal; and
a second switch connected between the second internal node and the second output node, and configured to output a signal of the second internal node as the second fingerprint sensing signal in response to the fingerprint enable signal.

17. The display device of claim 16, wherein the second sensing driving circuit comprises:
a second driving circuit configured to receive a second input signal and a touch clock signal, and comprising a third internal node and a fourth internal node;
a third switch connected between the third internal node and the first output node, and configured to output a signal of the third internal node as the first touch sensing signal in response to a touch enable signal; and
a fourth switch connected between the fourth internal node and the second output node, and configured to output a signal of the fourth internal node as the second touch sensing signal in response to the touch enable signal.

18. The display device of claim 17, wherein, in the first detection mode, the touch enable signal is at an active level, and the fingerprint enable signal is at an inactive level, and
wherein, in the second detection mode, the touch enable signal is at an inactive level, and the fingerprint enable signal is at an active level.

19. The display device of claim 17, wherein the touch clock signal has a first operating frequency, and
wherein the fingerprint clock signal has a second operating frequency lower than the first operating frequency.

20. The display device of claim 17, wherein, in the first detection mode, each of the first touch sensing signal and the second touch sensing signal has a first operating frequency, and
wherein, in the second detection mode, each of the first fingerprint sensing signal and the second fingerprint sensing signal has a second operating frequency lower than the first operating frequency.

21. The display device of claim 17, wherein the buffer circuit comprises:
a first buffer transistor connected between a first voltage input terminal and an output terminal for outputting the sensor scan signal, and comprising a gate electrode connected to the first output node; and
a second buffer transistor connected between the output terminal and an input terminal, and comprising a gate electrode connected to the second output node.

22. The display device of claim 21, wherein the input terminal is configured to receive the touch clock signal in the first detection mode, and receive the fingerprint clock signal in the second detection mode.

23. A display device comprising:
a base layer;
a circuit layer on the base layer; and
an element layer on the circuit layer, and comprising a light emitting element and a sensing element,
wherein the circuit layer comprises:
a sensor driving circuit connected to the sensing element; and
a sensor driver configured to output a sensor scan signal to a gate of a transistor in the sensor driving circuit to select the transistor to output a sensing signal to a readout line connected to the transistor, and
wherein the sensor driver comprises:
a buffer circuit electrically connected to a first output node and a second output node, and configured to output the sensor scan signal;
a first sensing driving circuit configured to output a first touch sensing signal and a second touch sensing signal to the first output node and the second output node, respectively, in a first detection mode; and
a second sensing driving circuit configured to output a first fingerprint sensing signal and a second fingerprint sensing signal to the first output node and the second output node, respectively, in a second detection mode.

24. The display device of claim 23, wherein, in the first detection mode, the first sensing driving circuit is configured to output the first touch sensing signal and the second touch sensing signal to the first output node and the second output node, respectively, in response to a touch enable signal at an active level, and
wherein, in the second detection mode, the second sensing driving circuit is configured to output the first fingerprint sensing signal and the second fingerprint sensing signal to the first output node and the second output node, respectively, in response to a fingerprint enable signal at an active level.

25. The display device of claim 23, wherein the buffer circuit comprises:
a first buffer transistor connected between a first voltage input terminal and an output terminal for outputting the sensor scan signal, and comprising a gate electrode connected to the first output node; and
a second buffer transistor connected between the output terminal and an input terminal, and comprising a gate electrode connected to the second output node.

26. The display device of claim 25, wherein the input terminal is configured to receive a touch clock signal in the first detection mode, and receive a fingerprint clock signal in the second detection mode.

* * * * *